United States Patent
Pope et al.

(10) Patent No.: US 9,256,560 B2
(45) Date of Patent: Feb. 9, 2016

(54) CONTROLLER INTEGRATION

(75) Inventors: Steven L. Pope, Costa Mesa, CA (US);
David Riddoch, Cambridge (GB);
Derek Roberts, Cambridge (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 798 days.

(21) Appl. No.: 12/687,382

(22) Filed: Jan. 14, 2010

(65) Prior Publication Data
US 2011/0029734 A1 Feb. 3, 2011

Related U.S. Application Data

(60) Provisional application No. 61/289,323, filed on Dec. 22, 2009.

(30) Foreign Application Priority Data

Jul. 29, 2009 (GB) .................................. 0913231.7
Oct. 8, 2009 (GB) .................................. 0917630.6

(51) Int. Cl.
*G06F 13/38* (2006.01)
*H04L 12/46* (2006.01)
(Continued)

(52) U.S. Cl.
CPC .......... *G06F 13/385* (2013.01); *H04L 12/4633* (2013.01); *H04L 29/12584* (2013.01);
(Continued)

(58) Field of Classification Search
CPC . H04L 61/2596; H04L 61/6022; H04L 69/22; H04L 12/4633; H04L 29/12584; H04L 29/12839; H04L 49/90; G06F 13/385

USPC .............. 370/350, 389, 392, 395.1, 401, 410, 370/412, 419, 426; 709/228, 230, 245
See application file for complete search history.

(56) References Cited

U.S. PATENT DOCUMENTS 5,272,599 A 12/1993 Koenen
5,325,532 A 6/1994 Crosswy et al.
(Continued)

FOREIGN PATENT DOCUMENTS

EP 620521 A2 10/1994
EP 1770508 A2 4/2007
(Continued)

OTHER PUBLICATIONS

Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
(Continued)

*Primary Examiner* — Ajay Cattungal
(74) *Attorney, Agent, or Firm* — Haynes Beffel & Wolfeld LLP; Warren S. Wolfeld

(57) ABSTRACT

Roughly described, a data processing system comprises a central processing unit and a split network interface functionality, the split network interface functionality comprising: a first sub-unit collocated with the central processing unit and configured to at least partially form a series of network data packets for transmission to a network endpoint by generating data link layer information for each of those packets; and a second sub-unit external to the central processing unit and coupled to the central processing unit via an interconnect, the second sub-unit being configured to physically signal the series of network data packets over a network.

70 Claims, 6 Drawing Sheets

(51) Int. Cl.
*H04L 29/12* (2006.01)
*H04L 12/861* (2013.01)
*H04L 29/06* (2006.01)

(52) U.S. Cl.
CPC .......... *H04L29/12839* (2013.01); *H04L 49/90* (2013.01); *H04L 61/2596* (2013.01); *H04L 61/6022* (2013.01); *H04L 69/22* (2013.01)

(56) References Cited

U.S. PATENT DOCUMENTS

| | | | |
|---|---|---|---|
| 5,535,200 A * | 7/1996 | Gardner | 370/410 |
| 5,946,189 A | 8/1999 | Koenen et al. | |
| 6,098,112 A | 8/2000 | Ishijima et al. | |
| 6,160,554 A | 12/2000 | Krause | |
| 6,304,945 B1 | 10/2001 | Koenen | |
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,950,961 B2 | 9/2005 | Krause et al. | |
| 6,978,331 B1 | 12/2005 | Kagan et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,978,606 B2 | 7/2011 | Buskirk et al. | |
| 8,000,336 B2 | 8/2011 | Harel | |
| 2001/0053151 A1 * | 12/2001 | Chikamatsu et al. | 370/395.1 |
| 2002/0059052 A1 | 5/2002 | Bloch et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0152344 A1 * | 10/2002 | Holm et al. | 710/260 |
| 2002/0156784 A1 | 10/2002 | Hanes et al. | |
| 2003/0007165 A1 | 1/2003 | Hudson | |
| 2003/0037178 A1 * | 2/2003 | Vessey et al. | 709/319 |
| 2003/0039248 A1 * | 2/2003 | Weaver | 370/392 |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2003/0236919 A1 * | 12/2003 | Johnson et al. | 709/251 |
| 2004/0071250 A1 | 4/2004 | Bunton et al. | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0252685 A1 | 12/2004 | Kagan et al. | |
| 2005/0008223 A1 | 1/2005 | Zeng et al. | |
| 2005/0018221 A1 | 1/2005 | Zeng et al. | |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0086351 A1 * | 4/2005 | Ianos | 709/230 |
| 2005/0132249 A1 * | 6/2005 | Burton et al. | 714/5 |
| 2005/0172181 A1 | 8/2005 | Huliehel | |
| 2005/0219278 A1 | 10/2005 | Hudson | |
| 2005/0219314 A1 | 10/2005 | Donovan et al. | |
| 2005/0231751 A1 | 10/2005 | Wu et al. | |
| 2006/0026443 A1 | 2/2006 | McMahan et al. | |
| 2006/0045098 A1 | 3/2006 | Krause | |
| 2006/0126619 A1 | 6/2006 | Teisberg et al. | |
| 2006/0152398 A1 | 7/2006 | Jubien et al. | |
| 2006/0165074 A1 | 7/2006 | Modi et al. | |
| 2006/0190663 A1 * | 8/2006 | Lu | 710/312 |
| 2006/0193318 A1 | 8/2006 | Narasimhan et al. | |
| 2006/0228637 A1 | 10/2006 | Jackson et al. | |
| 2006/0248191 A1 | 11/2006 | Hudson et al. | |
| 2007/0022206 A1 | 1/2007 | Pope et al. | |
| 2007/0076591 A1 | 4/2007 | Khan | |
| 2007/0188351 A1 | 8/2007 | Brown et al. | |
| 2007/0217409 A1 * | 9/2007 | Mann | 370/389 |
| 2007/0220183 A1 | 9/2007 | Kagan et al. | |
| 2007/0266412 A1 * | 11/2007 | Zmudzinski et al. | 713/300 |
| 2008/0024586 A1 | 1/2008 | Barron | |
| 2008/0104363 A1 * | 5/2008 | Raj et al. | 711/207 |
| 2008/0109526 A1 | 5/2008 | Subramanian et al. | |
| 2008/0115216 A1 | 5/2008 | Barron et al. | |
| 2008/0115217 A1 | 5/2008 | Barron et al. | |
| 2008/0126509 A1 | 5/2008 | Subramanian et al. | |
| 2008/0135774 A1 | 6/2008 | Hugers | |
| 2008/0147828 A1 | 6/2008 | Enstone et al. | |
| 2008/0148400 A1 | 6/2008 | Barron et al. | |
| 2008/0177890 A1 | 7/2008 | Krause et al. | |
| 2008/0181245 A1 * | 7/2008 | Basso et al. | 370/412 |
| 2008/0205388 A1 * | 8/2008 | Colville et al. | 370/389 |
| 2008/0212610 A1 * | 9/2008 | Ward et al. | 370/469 |
| 2008/0228946 A1 | 9/2008 | Roberts et al. | |
| 2008/0244060 A1 | 10/2008 | Cripe et al. | |
| 2008/0301406 A1 | 12/2008 | Jacobson et al. | |
| 2008/0304519 A1 | 12/2008 | Koenen et al. | |
| 2009/0165003 A1 | 6/2009 | Jacobson et al. | |
| 2009/0201926 A1 | 8/2009 | Kagan et al. | |
| 2009/0213856 A1 | 8/2009 | Paatela et al. | |
| 2009/0268612 A1 | 10/2009 | Felderman et al. | |
| 2009/0279559 A1 * | 11/2009 | Wong et al. | 370/412 |

(56) References Cited

U.S. PATENT DOCUMENTS

| | | | |
|---|---|---|---|
| 2009/0302923 A1 | 12/2009 | Smeloy et al. | |
| 2009/0313391 A1* | 12/2009 | Watanabe | 710/8 |
| 2010/0088437 A1 | 4/2010 | Zahavi | |
| 2010/0138840 A1 | 6/2010 | Kagan et al. | |
| 2010/0158176 A1* | 6/2010 | Luo et al. | 375/350 |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2010/0325292 A1* | 12/2010 | Takeda et al. | 709/228 |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |

FOREIGN PATENT DOCUMENTS

| | | |
|---|---|---|
| WO | 0148972 A1 | 7/2001 |
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference 1996, Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, Apr. 22, 2001.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.

(56) References Cited

OTHER PUBLICATIONS

Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kernnani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson; Proceedings of the Third International Conference on High Speed Networking, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, Oct. 1992.
Peter Steenkiste; ACM Computer Communication Review, vol. 22, No. 4, Oct. 1992.
Paul E. McKenney and Ken F. Dove; ACM Computer Communication Review, vol. 22, No. 4, Oct. 1992.
Erich Ruetsche and Matthias Kaiserswerth; Proceedings of the IFIP TC6NVG6.4 Fourth International Conference on High Performance Networking IV, Dec. 14, 1992.
C. Traw and J. Smith; IEEE Journal on Selected Areas in Communications, pp. 240-253, Feb. 1993.
E. Ruetsche; ACM Computer Communication Review, vol. 23, No. 3, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Hayter M. et al., "The Desk Area Network," ACM Transactions on Operating Systems, pp. 14-21, Oct. 1991.
Finn G. "An Integration of Network Communication with Workstation Architecture," ACM Computer Communication Review, 1991, 11 pp.
IMS T800 Transputer presented in "IMS T800 Architecture", INMOS Technical Note 6, Inmos Ltd, Jan. 1988, 23 pp, published at http://www.transputer.net/tn/06/tn06.html.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.

(56) References Cited

OTHER PUBLICATIONS

L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
European Search Report mailed Nov. 16, 2010 in related application EP10170335.3.
Binkert N.L. et al., "Performance Analysis of System Overheads in TCP/;IP Workloads," Proc. 14th Int'l Conf. on Parallel Architectures and Compilation Techniques (PACT'05), St. Louis, MO, Sep. 2005, 11pp.
European Examination Report mailed Jul. 31, 2012 in related application EP10170335.3, 7pp.
Binkert N L et al: "Performance Analysis of System Overheads in TCP/IP Workloads", Parallel Architectures and Compilation Techniques, 2005. PACT 2005. 14th International Conference on St. Louis, MO, CA Sep. 17-21, 2005, Piscataway, NJ, USA IEEE LNKD—DOI: 10.1109/PACT.2005.35, Sep. 17, 2005, pp. 218-230.
EP 13199318.0-1954, European Search Report, Mar. 24, 2014, 8 Pages.
EP 10170335.3—Response to Office Action dated Jul. 31, 2012, as filed Jan. 25, 2013, 3 pages.
EP 06719953.9—Response to Notice of Loss of Rights and Search Opinion dated Nov. 16, 2010, as filed Nov. 17, 2011, 3 pages.
EP 13199318.0—Response to Office Action dated Mar. 26, 2014, as filed Sep. 26, 2014, 4 pages.
DP83820 Datasheet—10/100/1000 Mb/s PCI Ethernet Network Interface Controller, National Semiconductor, Feb. 2001, 89 pages.

\* cited by examiner

CONTROLLER INTEGRATION

BACKGROUND OF THE INVENTION

This invention relates to a novel architecture for a network interface device for a data processing system and a method for exchanging network data between the processors of a data processing system, and in particular a blade server. A novel architecture for a PCIe device is also disclosed.

A conventional data processing system comprising one or more processors and a memory is attached to a network by means of a peripheral network interface device. The network interface device allows the data processing system to receive and transmit data over the network. The data processing system and network interface device communicate over a peripheral data bus, such as PCIe.

An Ethernet network interface device includes a controller, which typically forms data packets for transmission over the network, controls the data flows passing through the device and coordinates the transfer of data over the data bus between the data processing system and the network interface device. The physical transfer of data over the network is handled by a so-called "PHY" of the network interface device, which performs the signalling of network data over the network at the physical level of the Ethernet specification.

In a typical data processing system, several data buses may be involved in the transmission or reception of data over the network. Often there are different buses between the processor and memory, local storage devices and peripherals such as the network interface device. Data transfer over each bus has an associated overhead, and, along with the PHY, the various data bus circuits are typically amongst the most expensive components in terms of introduced latency and power requirements during data transmission or reception over a network.

Furthermore, the rate of transmission of data packets over the fabric of the network itself is limited by the network bandwidth, which imposes a maximum data rate between hosts on the network. This can be particularly limiting if the network fabric is used to connect the blades of a blade server.

Conventional network interface devices are provided as peripherals which are connected to a data processing system over a peripheral bus, such as PCIe. The network interface device may be a standalone peripheral card or it may be supported at the motherboard of the data processing system, but the device is accessed by the data processing system over the appropriate bus. This configuration is shown in FIG. 1, in which the CPU 103 of the data processing system 101 accesses the network interface device (NIC) 102 over a PCIe bus 106. The interface between the CPU and the PCIe bus is provided by chipset 105, which also typically provides direct memory access (DMA) to the memory by means of a memory controller. Network interface device 102 comprises a controller 107 and a PHY 108—the controller largely handling data flows at the link layer of the network protocol in use over network 109, and the PHY handling the transmission and reception of network data packets over the network in accordance with the physical layer requirements of the network protocol.

Since the receive and transmit queues for applications executing at processor 103 are located at memory 104, the network interface device must perform reads and writes directly to the memory in order to transmit and receive data over the network. Typically two or three memory accesses are required to effect each transmit operation, and one or two memory accesses are required to effect each receive operation. Often a network interface device will be operable to read and write to the memory by means of direct memory access (DMA), but all such accesses must still be performed over the peripheral data bus. The power consumption of each transmit or receive operation is not insignificant because each access must traverse the serialisation/deserialisation (SERDES) circuitry at the chipset 105 (which provides the interface to the bus for the processor/memory controller) and the SERDES circuitry at the network interface device (which provides the interface to the bus for the NIC). For a high speed network interface device, thousands of transmit and/or receive operations can be performed every second and the total power consumption of such an architecture can become very large. Similarly, the repeated memory accesses over the peripheral data bus introduces a significant latency to the transmit and receive operations performed by the network interface device.

For certain applications, System-on-a-Chip (SoC) devices have been developed which include a processing core and a network interface device, thus placing the network interface device closer to a memory accessible to the processor. For example, the STMicroelectronics STM32W family of SoC devices provides a 32-bit ARM processor and an integrated IEEE 802.15.4 radio. However, integrating a full network interface including a PHY into a processor substantially increases the power required by the processor and hence the amount of heat which must be dealt with at the processor. Furthermore, the signals handled at the PHY introduce a significant amount of additional electrical interference into the processor, making an SoC architecture unsuitable for a high speed CPU.

Improved architectures for allowing the components of a data processing system (such as a CPU and network interface device) to communicate with one another have been proposed, but none provide a low power architecture for a network interface having a low latency data path to host memory. Previous attempts to improve the architecture for internal communications within a data processing system include the IMS T800 Transputer presented in "IMS T800 Architecture", INMOS Technical Note 6, INMOS Ltd, January 1988, which is published at http://www.transputer.net/tn/06/tn06.html. Other such architectures are described in Finn, Gregory G. "An Integration of Network Communication with Workstation Architecture", ACM Computer Communication Review, October 1991, and Hayter, M., McAuley, D., "The Desk Area Network", ACM Transactions on Operating Systems, pp. 14-21, October 1991.

Previously proposed schemes describing Ethernet protocol encapsulation are described in U.S. patent application Ser. Nos. 10/548,121 and 12/105,412.

There is therefore a need for an improved network interface device architecture having lower power requirements and a lower latency data path to host memory.

SUMMARY OF THE INVENTION

According to a first aspect of the present invention there is provided a data processing system comprising a central processing unit and a split network interface functionality, the split network interface functionality comprising: a first sub-unit collocated with the central processing unit and configured to at least partially form a series of network data packets for transmission to a network endpoint by generating data link layer information for each of those packets; and a second sub-unit external to the central processing unit and coupled to the central processing unit via an interconnect, the second sub-unit being configured to physically signal the series of network data packets over a network.

Preferably the first sub-unit is configured to encapsulate each network data packet of the series in one or more interconnect data packets in accordance with the data protocol in use over the interconnect. Preferably the first sub-unit is configured to transmit the interconnect data packets to the second sub-unit so as to cause the second sub-unit to signal the respective network data packets over the network.

Preferably the first sub-unit is configured to partially form the series of network data packets and the second sub-unit is configured to complete the formation of each of the series of network data packets at the data link layer of the network protocol in use over the network. Suitably the second sub-unit is configured to complete the formation of each of the series of network data packets at the data link layer by calculating one or more checksums for each network data packet.

Preferably the second sub-unit is configured to physically signal the series of completed data packets over the network in accordance with the physical layer requirements of the network protocol in use over the network.

Preferably a data processing system as described further comprises a memory and/or cache coupled to the central processing unit and, at the central processing unit, a memory management unit configured to provide access to the memory and/or cache for the central processing unit and the first sub-unit. Preferably the memory and/or cache is configured to hold a transmit queue comprising data for transmission over the network and the first sub-unit is configured to access the transmit queue by means of a read request to the memory management unit and form the series of network data packets using the data for transmission over the network.

Preferably the second sub-unit is operable to receive a series of network data packets over the network and the first sub-unit is configured to at least partially process each received network data packet at the data link layer so as to extract data carried within the network data packet.

Preferably the first sub-unit is configured to store at the memory a forwarding table comprising information such as to allow the first sub-unit to, for each received network data packet, route extracted data to one or more receive queues at the memory and/or another network device in dependence on the content of the received network data packet.

Suitably the second sub-unit is configured to encapsulate each received network data packet in one or more interconnect data packets in accordance with the data protocol in use over the data link of the interconnect proximal to the second sub-unit.

Preferably the second sub-unit is configured to transmit the interconnect data packets to the first sub-unit so as to cause the first sub-unit to at least partially process each received network data packet at the data link layer and extract the data carried within received network data packet.

According to a second aspect of the present invention there is provided a data processing system comprising: a central processing unit including a network interface controller, the network interface controller being configured to form intermediate data units by at least partially framing at the data link layer data for transmission over a network in accordance with a network protocol, each intermediate data unit including a destination network address for the data for transmission; a memory coupled to the central processing unit; a media interface connected to the network and configured to transmit fully-formed data packets over the network; and a first interconnect extending between the central processing unit and the media interface, the interconnect being formed of one or more data links; wherein the network interface controller is configured to encapsulate intermediate data units of the network protocol in interconnect data packets for transmission over the first interconnect, and the media interface is configured to extract intermediate data units from interconnect data packets received over the first interconnect and process the intermediate data units at the physical layer so as to complete the formation of data packets in accordance with the network protocol.

Preferably the network interface controller is configured to encapsulate each intermediate data unit in one or more interconnect data packets in accordance with the data protocol in use over the data link of the first interconnect proximal to the central processing unit. Preferably the network interface controller is configured to cause the one or more interconnect data packets to be transmitted to the media interface so as to cause the media interface to transmit a fully-formed network data packet over the network.

Preferably the network interface controller is configured to write an encapsulation header to each of the interconnect data packets, the encapsulation header comprising information such as to allow the media interface to reassemble the respective intermediate data unit from the interconnect data packets.

Suitably the first interconnect comprises two data links: a first data link extending between the central processing unit and a translation unit; and a second data link extending between the translation unit and the media interface; the translation unit being configured to translate interconnect data packets framed in accordance with the data protocol in use over the first data link into interconnect data packets framed in accordance with the data protocol in use over the second data link, and vice versa.

Preferably the translation unit is configured to translate interconnect data packets by: removing framing data of the data protocol in use over the first data link and re-framing the one or more interconnect data packets in accordance with the data protocol in use over the second data link; or adding an additional framing layer about the one or more interconnect data packets in accordance with the data protocol in use over the second data link. Preferably the first data link is a CPU interconnect and the second data link is a peripheral data bus. Preferably the media interface is supported at the peripheral data bus. The CPU interconnect can be one of a HyperTransport interconnect, a QuickPath interconnect and a PCIe interconnect. Preferably the peripheral data bus is PCIe.

Preferably the central processing unit further comprises a memory management unit configured to provide access to the memory for the central processing unit and the network interface controller.

Preferably the network interface controller is configured to, if the destination network address belongs to a process supported at the central processing unit, write the data for transmission directly to a receive queue at the memory without encapsulating that data in one or more interconnect data packets, the receive queue corresponding to the destination network address. Preferably the network interface controller is further configured to not frame that data at the data link layer in accordance with the network protocol.

Preferably the memory is configured to hold one or more transmit queues comprising data for transmission over the network and the network interface controller is operable to access said data for transmission at its respective transmit queue by means of a read request to the memory management unit.

Preferably the memory management unit comprises a cache operable to store a copy of at least some of the data held at the memory, the cache being accessible to both the central processing unit and the network interface controller. Preferably the cache is configured to store data recently accessed at the memory by the central processing unit.

Preferably the network interface controller is configured to, for any data for transmission that is available at both the memory and the cache, read that data for transmission from the cache in preference to reading the data from the memory. Preferably the network interface controller is configured to, for data for transmission that is not available at the cache, read the said data from the memory and not write the data into the cache. Preferably the network interface controller is configured to, on reading the data for transmission from the cache, invalidate the corresponding lines of the cache so as to allow other processes executing at the central processing unit to overwrite those lines.

Preferably: the media interface is operable to receive network data packets over the network and encapsulate the received network data packets in interconnect data packets for transmission over the first interconnect; and the network interface controller is configured to extract the received network data packets from the interconnect data packets and at least partially process at the data link layer each received network data packet in accordance with the network protocol so as to extract the data carried within each received network data packet.

Preferably the media interface is configured to encapsulate each received network data packet in one or more interconnect data packets in accordance with the data protocol in use over the data link of the first interconnect proximal to the media interface. Preferably the media interface is configured to transmit the interconnect data packets to the network interface controller in order to cause the network interface controller to at least partially process each received network data packet at the data link layer and write the data carried within each received network data packet to at least one receive queue at the memory identified by a destination network address included within that received network data packet.

Preferably the network interface controller is configured to, on writing the data carried within a received network data packet to a receive queue at the memory, write that data to the cache.

Preferably the network interface controller is configured to store at the memory a forwarding table comprising information such as to allow the network interface controller to, for each received network data packet, select in dependence on the destination network address one or more receive queues at the memory and/or another network device to which data of the received network data packet is to be routed.

Preferably the media interface is configured to write an encapsulation header to each of the interconnect data packets, the encapsulation header comprising information such as to allow the network interface controller to reassemble the respective network data packet from the interconnect data packets.

Preferably the memory management unit is configured to, on receiving a request to access a virtual memory address from either the central processing unit or the network interface controller, translate that virtual memory address into a physical memory address of the data processing system and access that physical memory address.

Preferably the memory management unit is configured to, if a translation of a virtual memory address on behalf of the network interface controller fails, raise a page fault to the network interface controller. Preferably the network interface controller is configured to, responsive to the page fault: if the virtual memory address relates to a transmit queue, cause the transmit queue corresponding to that virtual memory address to be paused until the respective page has been rewritten to memory; or if the virtual memory address relates to a receive queue, write the data of the received network data packet in respect of which the request was issued to a reserved buffer for retrieval by a protocol processing entity of the data processing system.

Suitably the data processing system further comprises: a second central processing unit including a second network interface controller, the second network interface controller also being configured to form intermediate data units by at least partially framing at the data link layer data for transmission in accordance with the network protocol, each intermediate data unit including a destination network address for the data for transmission; and a second interconnect extending between the second central processing unit and the media interface, the second interconnect being formed of one or more data links; wherein the second network interface controller is configured to encapsulate intermediate data units of the network protocol in interconnect data packets for transmission over the second interconnect, and the media interface is configured to extract intermediate data units from interconnect data packets received over the interconnect and process the intermediate data units at the physical layer so as to complete the formation of data packets in accordance with the network protocol. The one or more data links of the second interconnect may be shared with one or more data links of the first interconnect.

Preferably the network interface controller is configured to, if the destination network address of intermediate data units formed at the central processing unit is a network address supported at the second central processing unit, cause encapsulated interconnect data packets comprising the intermediate data units to be transmitted to the second network interface controller.

Preferably the media interface includes a management controller configured to handle management commands received for the network interface devices formed by (a) the media interface and the network interface controller and (b) the media interface and the second network interface controller.

Suitably the data processing system is a blade server comprising one or more blades supported at a chassis, each blade having one or more central processing units at least one of which includes a network interface controller, and the media interface being located at the chassis of the blade server.

The central processing unit and second central processing unit may be located at the same blade of the blade server. Preferably the central processing unit and second central processing unit are accessible to one another over a CPU interconnect comprising a data link of the first interconnect and a data link of the second interconnect.

The central processing unit and second central processing unit may be located at different blades of the blade server. Preferably the network interface controller is configured to, if the destination network address of intermediate data units formed at the central processing unit is a network address belonging to a process supported at the second central processing unit, cause interconnect data packets encapsulating the intermediate data units to be transmitted over the CPU interconnect to the second network interface controller not via the media interface.

Preferably the media interface is supported at a peripheral data bus and the blades of the blade server are configured to communicate with one another over the peripheral data bus.

Preferably the data processing system further comprises a switch at the chassis of the blade server, the switch being configured to route interconnect data packets between the blades of the blade server. Suitably the switch is configured to route interconnect data packets in dependence on their framing information at the level of the data protocol in use over the peripheral data bus. Suitably the switch is configured to route interconnect data packets encapsulating intermediate data units in dependence on framing information of the intermediate data units at the level of the network protocol.

Suitably the peripheral data bus is PCIe and the switch is a PCIe switch. The media interface may be one of a regular PCIe device, an SR-IOV PCIe device and an MR-IOV PCIe device. The media interface may be an SR-IOV PCIe device and the switch an MR-IOV PCIe switch.

Suitably the media interface and each network interface controller of the data processing system are configured to exchange control data by means of one or more interconnect data packets.

Preferably the network protocol is Ethernet.

According to a third aspect of the present invention there is provided a method for transmitting data over a network from a data processing system comprising a media interface at the interface to the network, a central processing unit having a memory management unit for accessing a memory, and an interconnect connected between the central processing unit and the media interface, the method comprising: a network interface controller located at the central processing unit: retrieving data for transmission over the network from a transmit queue at the memory by means of the memory management unit; at least partially framing at the data link layer data packets of a network protocol containing the retrieved data; and in accordance with the data protocol in use over the interconnect, encapsulating the data packets of the network protocol in data packets for transmission over the interconnect and transmitting the data packets over the interconnect to the media interface; the media interface: receiving the encapsulated data packets; extracting the data packets of the network protocol from the encapsulated data packets; processing the data packets of the network protocol at the physical layer so as to complete the framing of the data packets in accordance with the network protocol; and transmitting the fully-formed data packets of the network protocol onto the network.

According to a fourth aspect of the present invention there is provided a method for receiving data over a network at a data processing system comprising a media interface at the interface to the network, a central processing unit having a memory management unit for accessing a memory, and an interconnect connected between the central processing unit and the media interface, the method comprising: the media interface: receiving network data packets over the network; and in accordance with the data protocol in use over the interconnect, encapsulating the received network data packets in data packets for transmission over the interconnect and transmitting the data packets over the interconnect to a network interface controller located at the central processing unit; the network interface controller: receiving the encapsulated data packets; extracting the received network data packets from the encapsulated data packets; at least partially processing each received network data packet at the data link layer in accordance with the network protocol so as to extract the data carried within each received network data packet; and writing the extracted data to a receive queue at the memory by means of the memory management unit.

According to a fifth aspect of the present invention there is provided a method for communicating data between central processing units at a data processing system having a first central processing unit and a second central processing unit coupled together by means of an interconnect, each central processing unit comprising a respective network interface controller operable to (a) form intermediate data units by at least partially framing data for communication at the data link layer in accordance with a network protocol, and (b) at least partially process at the data link layer in accordance with the network protocol intermediate data units so as to extract the data for communication carried within each intermediate data unit, the method comprising:

the first central processing unit passing data for communication to its first network interface controller; the first network interface controller: forming intermediate data units comprising the data for communication by at least partially framing the data for communication at the data link layer in accordance with the network protocol; encapsulating the intermediate data units of the network protocol in data packets for transmission over the interconnect; and transmitting the encapsulated data packets over the interconnect to the second network interface controller; the second network interface controller: receiving the encapsulated data packets; extracting the intermediate data units from the encapsulated data packets; at least partially processing each intermediate data unit at the data link layer in accordance with the network protocol so as to extract the data carried within each intermediate data unit; and passing the extracted data to the second central processing unit.

According to a sixth aspect of the present invention there is provided a central processing unit for a data processing system, the central processing unit comprising: a processing core; a link module for communicating data packets of a predetermined data protocol over a data bus; a memory management unit operable to retrieve data from a memory coupled to the central processing unit; and a network interface controller configured to: retrieve data for transmission over a network by means of the memory management unit; frame at the data link layer data packets of a network protocol that contain retrieved data; and cause those packets to be encapsulated in data packets of the predetermined data protocol and communicated over the data bus by means of the link module.

Preferably the network interface controller does not frame data packets at the physical layer of the network protocol.

According to a seventh aspect of the present invention there is provided a central processing unit for a data processing system, the central processing unit comprising: a processing core; a cache; a memory management unit operable to retrieve data from a memory coupled to the central processing unit; and a network interface controller configured to, when in use, store at least some of its state at a memory coupled to the central processing unit; wherein the processing core and network interface controller are configured to access a memory coupled to the central processing unit by means of the memory management unit, and the cache is configured to cache data stored at a memory coupled to the central processing unit.

Suitably the state of the network interface controller includes one or both of a forwarding table and an address translation table.

According to an eighth aspect of the present invention there is provided an electronic device supported at a data processing system and presenting itself as a PCIe device to the data processing system, the data processing system comprising a central processing unit and a PCIe data bus, and the peripheral device having two components: a core component located at the central processing unit, the core component being operable to handle I/O requests for the electronic device; and a peripheral component accessible to the core component over the PCIe data bus; wherein the core component is configured to be responsive to I/O requests directed to the peripheral component.

Preferably the core component is allocated a hardware address range defining its control aperture and the peripheral component is configured to provide a Base Address Register indicating a range of hardware addresses that includes the base address of the control aperture of the core component such that I/O requests directed to the range of hardware addresses indicated by the Base Address Register are handled at the control aperture of the core component.

Suitably the peripheral component is additionally a component of one or more other PCIe devices and the peripheral component is configured to provide an additional Base Address Register for each other PCIe device, each additional Base Address Register being configured such that I/O requests directed to the range of hardware addresses indicated by that Base Address Register are handled at a respective core component of that other PCIe device.

Preferably the peripheral component is configured to forward interrupt configuration requests it receives to the core component for handling at the core component.

Preferably the peripheral component further provides a legacy Base Address Register supporting a set of legacy registers, the peripheral component being configured to, when a legacy register is read or written, map the read or write to the legacy register to a read or write to the control aperture of the core component such that legacy I/O requests directed to the set of legacy registers are handled at the control aperture of the core component.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a novel arrangement of a network interface device at a data processing system.

Figure 2:
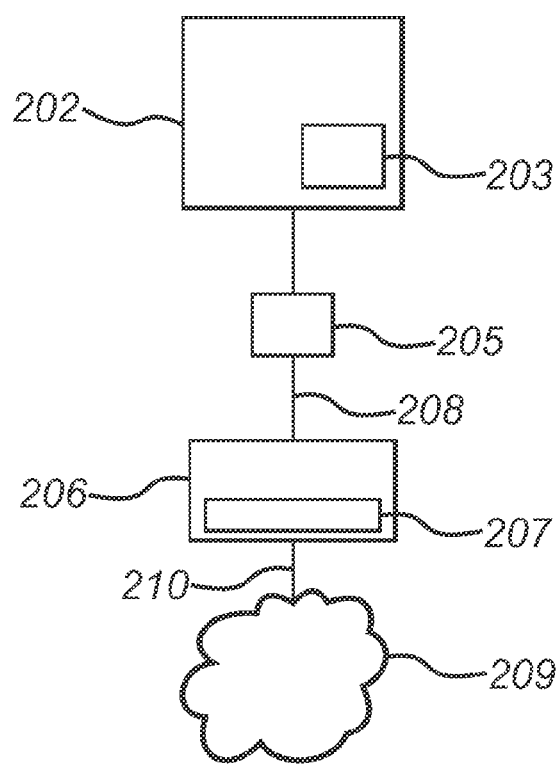
FIG. 2 is a schematic diagram of a network interface device configured in accordance with the present invention.

A network interface device and a processor configured in accordance with the present invention are shown in FIG. 2. Processor 202 is a central processing unit (CPU) suitable for use in a data processing system, such as a server or personal computer. The processor may comprise one or more processing cores within a single integrated circuit package (the cores may or may not be located on the same die). The network interface device comprises two units: a controller unit 203 located at processor 202 and having control logic for handling the transmission and reception of data packets over the network; and media interface unit 206 located at physical network link 210 and configured to provide a physical interface to network 209 for the processor. Processor 202 is coupled to the media interface unit 206 by means of an interconnect 208. The processor is configured to allow the controller unit to make use of interconnect 208.

Controller unit 203 is the controller circuitry of the network interface device formed by the controller unit and the media interface unit. The controller unit handles the logical aspects of transmit and receive operations such as: reading and writing data from and to host memory, forming data packets for transmission over a network in accordance with the protocol in use on the network (e.g. Ethernet); performing packet prioritization in accordance with one or more quality of service algorithms; and, determining the appropriate endpoint to which received data should be routed and routing the received data accordingly. The media interface unit performs the physical transmission and reception of data over the network under the control of the controller unit.

The media interface unit includes circuitry 207 configured to perform signalling at the physical layer over the network medium 210 (which could be an optical fibre or copper wire link). Such circuitry is typically provided as an integrated circuit and referred to as a PHY. The PHY is that part of the network interface device which forms the interface between link layer data packets and physical layer signalling over the network. For example, for an Ethernet network interface device the PHY performs physical layer signalling in accordance with IEEE 802.3.

Controller unit 203 is provided at the integrated circuit of processor 202 and not, as is conventional, at the network interface device. The processor and controller unit can therefore communicate directly because the data path between the two does not traverse an interconnect or any peripheral buses. This reduces the latency of communications between the processor and controller. Furthermore, the controller unit can benefit from the advanced process technology typically used in the fabrication of central processing units, reducing the die size and net power consumption of the network interface device and potentially allowing the circuitry to run at a higher clock speed. A higher clock speed has the benefit of reducing latency and increasing the maximum data transfer rate.

It is advantageous if interconnect 208 is a CPU interconnect or data bus native to the processor, such as a QuickPath Interconnect (QPI), HyperTransport (HT) or PCI Express (PCIe) link. This allows the controller unit to utilise the interconnect circuitry of the processor and does not require that the processor include additional circuitry for communications between the controller unit and the media interface. Furthermore, CPU interconnects typically offer high bandwidth and low latency as compared to peripheral data buses such as Peripheral Component Interconnect (PCI). Media interface 206 would in this case be configured to support communications over the CPU interconnect by providing it with the appropriate serialisation/deserialisation (SERDES) circuitry.

Alternatively, interconnect 208 can be a peripheral data bus, or a combination or two or more links coupled together by an optional I/O hub 205. For example, data transfers between the controller unit and media interface could be carried to and from the processor over a CPU interconnect such as HT and translated at an I/O hub for transmission over a peripheral data bus such as PCIe at which the media interface is supported. In a typical data processing system, an I/O hub would be provided at the chipset supporting processor 202.

If the media interface is supported at a peripheral data bus, the processor could be configured to include the necessary circuitry to allow it to communicate directly over that data bus. For example, if the media interface is provided on a PCIe data bus, the processor could be provided with circuitry accessible to the controller unit and configured to support PCIe communications to and from the processor.

Figure 3:
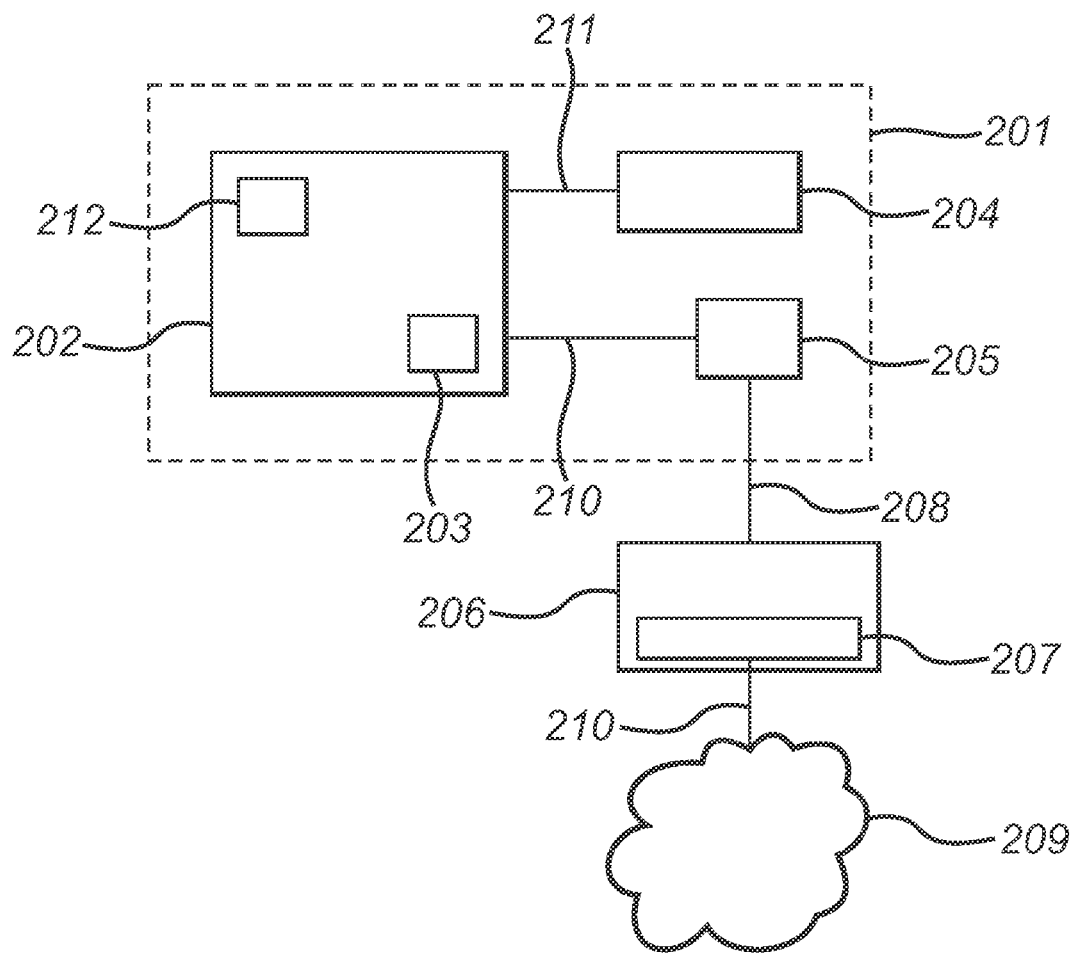
FIG. 3 is schematic diagram of a data processing system having a network interface device configured in accordance with the present invention.

FIG. 3 shows the use of a network interface device configured in accordance with the present invention in a data processing system. The processor of FIG. 2 forms the central processing unit of the data processing system 201 having a memory 204 accessible to the processor by means of memory bus 211. The data processing system supports software configured to execute at processor 202 and make use of the network interface device (NIC) formed by controller unit 203 and media interface 206.

A data processing system as referred to herein may be any kind of computer, such as a server, blade, desktop machine or portable device. A data processing system comprises one or more processing cores (these will be referred to as processors, although each physical processor may in fact support multiple cores) and a memory directly accessible to the processor by means of a memory controller integral to the processor. Typical data processing systems can support one or more network interface devices, storage devices and other peripherals by means of appropriate buses and interconnects.

The data processing system can cause the network interface device to transmit data stored at memory 204 over the network. Similarly, on receiving data the network interface device can write received data to memory 204 at receive queues established by the data processing system. Since it is the controller unit which performs read/writes into the memory of the data processing system in order to effect the transmission/reception of data, significant performance advantages can be achieved by locating the controller unit at the processor. In particular, the controller unit of the network interface device is configured to use the memory management unit 212 of the processor and access memory 204 over the memory bus 211 of the processor. This reduces the latency associated with each transmit or receive operation.

Figure 1:
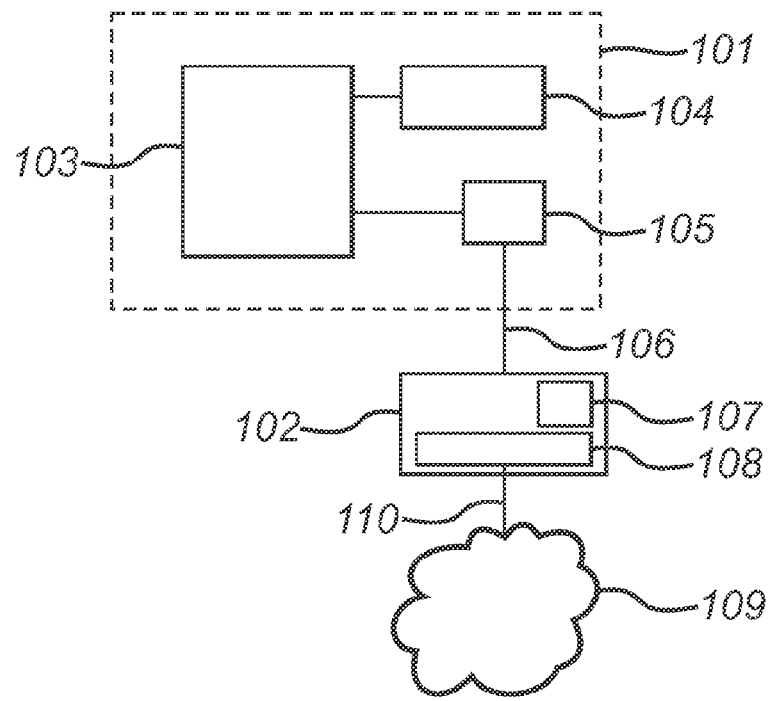
FIG. 1 is a schematic diagram of a conventional network interface device coupled to a data processing system by means of a peripheral bus.

Consider a transmit operation handled by a conventional network interface device 102 accessible to a processor 103 and memory 104 over a peripheral bus 106, as shown in FIG. 1. In order to transmit data over the network, the NIC typically (a) reads a descriptor from memory 104 identifying the location in memory at which the data for transmission is stored, (b) reads the identified data over the bus, and (c) transmits that data over the network. Each transmit operation therefore typically comprises two memory accesses, with a memory management unit at the I/O hub of the bus providing memory address translations. Furthermore, each memory access is performed over the peripheral bus.

In contrast, a controller unit of a network interface device configured in accordance with the present invention can perform a transmit operation by carrying out the following steps:

reading the identifier from memory by means of the high speed memory bus 211 of the processor;

reading the identified data (typically held at a transmit queue) over the same high speed memory bus;

passing that data to media interface 206 over interconnect 208 and causing the media interface to transmit the data over the network.

Any memory address translations required by the controller unit can be provided by the memory management unit of the processor, which is generally significantly faster than requesting memory address translations from the I/O hub. In this manner the controller unit can access a transmit queue by means of a read request to the memory management unit. Generally, the controller unit can access at the memory data for transmission, meta-data identifying data for transmission and other control information (such as control of offload and caching options). It is further preferable if the identifier and data for transmission can be read directly from a CPU memory cache by means of a read request to the memory management unit, from which reads incur very low latency.

The benefits of the present invention are even greater if data transfers between the controller and media interfaces of the network interface device take place over a high bandwidth low latency CPU interconnect, and additionally extend to receive operations performed by the network interface device.

A particular advantage of placing a network interface device controller (the controller unit) at the CPU is that memory transfers between network endpoints supported at the same processor occur over a very low latency data path. Such a situation can occur frequently in virtualised data processing systems in which a plurality of guest operating systems are supported by a privileged mode domain, such as a hypervisor. Since each guest OS operates independently of the others, an application at one guest OS may not know whether a network endpoint to which it wants to transmit data is supported at the same processor, a different processor at the same server, or on a remote server accessible over the physical network itself. Thus, an application at one guest OS may request that the network interface device (formed by the controller unit and media interface) transmits data to a network endpoint which in actual fact is at another guest OS supported at the same processor. In this case (assuming the data processing system is not configured in accordance with the VEPA protocol) the controller unit identifies that the target network endpoint is one that it handles and writes the data to a receive buffer of the target endpoint. Network transfers between endpoints supported at the same processor do not therefore involve the media interface and can be effected by reading from a transmit buffer in host memory and writing to a receive buffer in the same host memory. Since such network data packets do not traverse the media interface, the data packets may be only partially formed.

Of course, in principle it would be possible to additionally integrate at the processor the media interface comprising the PHY of the network interface device—i.e. fully integrate the network interface device with the processor. However, this has several disadvantages: additional pins would be required at the CPU package, essentially requiring a new socket specification to be defined; it would increase the power required by the CPU and the amount of heat which must be dealt with at the CPU; the high speed signals handled at the PHY would introduce a significant amount of additional electrical interference into the CPU; and, it would be very difficult to handle remote system management and wake-on-LAN at the network interface device because in low power states of the data processing system the CPU is off.

Ethernet-over-Interconnect

Generally, a controller unit 203 is configured to substantially form network data packets in accordance with the link layer requirements of the relevant network protocol and the media interface 207 is configured to signal those data packets onto the network fabric in accordance with the physical layer requirements of the network protocol. Some link layer requirements could be left to the media interface, such as the calculation of checksums or other protocol processing typically performed at dedicated hardware at a peripheral network interface device.

In order to convey at least partially formed network data packets (i.e. the packets may be fragmented and/or have incomplete headers or other data structures) from the controller unit to the media interface, a protocol is proposed to encapsulate the network data packets in packets of the data protocol in use over the interconnect. This protocol will be referred to as Ethernet-over-Interconnect, or EoI, since in the preferred embodiment the network protocol is Ethernet. However, in alternative embodiments, the network interface device formed by the controller unit and media interface could support communications over a network fabric other than Ethernet, in which case the EoI protocol described above would instead define the encapsulation of data packets of that other protocol. For example, the network interface device formed by the controller unit and media interface could be an Infiniband network interface device, with the controller unit being configured to form Infiniband data link layer data packets and the media interface being configured to transmit the signals in accordance with the physical layer requirements of the Infiniband specification. The use of the term "EoI" herein therefore generally refers to a protocol governing the encapsulation of network data packets in data packets suitable for transmission between a controller unit and media interface over an interconnect within a data processing system.

Figure 4:
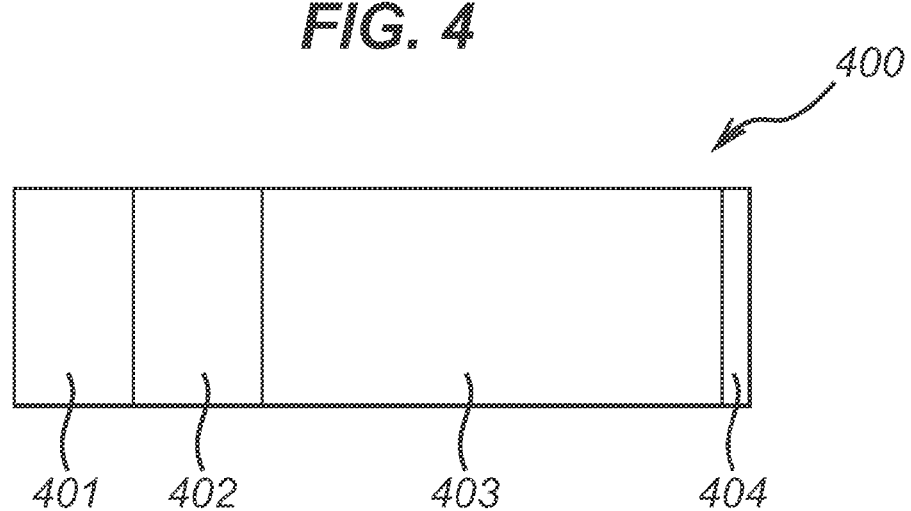
FIG. 4 is a schematic diagram of a data packet configured in accordance with the Ethernet-over-Interconnect data protocol.

The controller unit and media interface are configured to communicate data packets conforming to the data protocol(s) in use over the interconnect extending between them, the payloads of those data packets themselves conforming to the EoI protocol. Data packets transmitted over the interconnect would therefore typically have the nested structure shown in FIG. 4. Interconnect header 401 encapsulates EoI header 402 which in turn encapsulates at least part of an network data packet 403 formed at the controller unit. The headers may have corresponding footers 404, as required by the respective protocols.

As previously stated, it is preferred that the network interface device formed by controller unit 203 and media interface 207 is an Ethernet network interface device. The controller unit is therefore configured to substantially form Ethernet packets in accordance with the link layer requirements of IEEE 802.3 and the media interface is configured to signal Ethernet data packets onto the network fabric in accordance with the physical layer requirements of IEEE 802.3. The Ethernet packet would preferably include the Ethernet headers, but not include framing, preamble and CRC data which is calculated at the media interface.

In dependence on their relative packet sizes, a network data packet formed at the controller unit may span one or more interconnect data packets 400. The EoI header comprises the information required to correctly reassemble the parts of each network data packet and the destination device address. Each device on the interconnect has a device address to which interconnect data packets can be addressed. Preferably the EoI protocol supports control packets as well as data-path packets. Control packets would preferably be identifiable from their EoI header and allow the controller unit to configure, control and query the media interface. The media interface is configured to respond to queries from the controller unit with one or more control packets.

An EoI header of a data packet may further include additional information for use by intervening data bus switches, or controller units. Such information could include VLAN information, traffic class information and data packet priority information. This information could be mapped from the encapsulated network data packet (e.g. Ethernet).

For interconnect data protocols which strictly preserve the order of data packets between two endpoints, the EoI header could be dispensed with. In this case the media interface could be configured to reassemble network data packets by parsing incoming interconnect data packets for the start and end points of network data packets contained therein. In such an embodiment of the present invention control packets could be supported as a protocol encapsulated in the network data packets, or as a separate control channel encapsulated in the interconnect data packets.

Since EoI data packets conform to the data protocol in use over the interconnect, routing of the data packets is performed unchanged in dependence on the interconnect header. Data packets transmitted from the controller unit to the media interface or vice versa are therefore addressed to the target device at the interconnect level (typically through the use of physical device addresses). If the data must traverse more than one link between the controller unit and media interface, the I/O hub or interconnect switch coupling the two links performs any required address translation and may either (a) strip off the interconnect header from the initial link and replace it with an interconnect header in accordance with the protocol of the next link, or (b) encapsulate the interconnect data packet in accordance with the protocol of the next link. For example, if an Ethernet data packet is being sent from the controller unit to the media interface over initially a HyperTransport link to an I/O hub and then over a PCIe bus, the interconnect data packet would in the case of (a) have its HyperTransport header replaced with a PCIe header, or in the case of (b) have a PCIe header added encapsulating the HyperTransport data packet.

Importantly, because the controller unit and media interface exchange data with one another by means of EoI data packets, data link layer network data is transferred between the controller unit and media interface as interconnect data packets addressed (in the interconnect header) to the respective target device. For example, in order to perform a transmit operation over the network the controller unit would form a network data packet and cause that network data packet to be encapsulated and transmitted to the media interface in one or more interconnect data packets. The controller unit can therefore push data to the media interface by encapsulating the data in accordance with the EoI protocol and transmitting it onto the interconnect. This is to be contrasted with a conventional network interface device supported at a peripheral data bus which performs a transmit operation by requesting data for transmission from one or more addresses in host memory. In other words, a conventional network interface device must pull all the data it requires for a transmission operation from host memory, which is slower because the network interface device must first be told over the peripheral data bus which memory addresses contain the data for transmission.

The use of EoI allows symmetrical data transfers between the processor and media interface: when the processor has data to transmit over the network, it engages the controller unit to push that data to the media interface; when the media interface receives data over the network, the media interface pushes that data to the controller unit.

Furthermore, the provision of a controller unit at a processor and the use of the EoI protocol over an interconnect allows processors within a multi-processor data processing system to logically communicate at the CPU level by means of the network protocol supported by the controller unit (preferably Ethernet). However, communications between controller units does not take place at the speed of the network fabric to which the media interface provides an interface, but at the speed of the interconnect between the processors. The processors of such a data processing system form a mesh of processors logically interconnected by the network protocol and physically interconnected by relatively (compared with typical Ethernet links) high speed interconnects. Preferably these interconnects are CPU interconnects such as QPI, HyperTransport or PCIe, which provide high bandwidth and low latency links. Note that inter-processor communications handled in accordance with the network protocol need not involve the media interface and preferably take place directly between the controller units of the communicating processors, or within a single controller unit accessible to both processors.

It is also advantageous if a single media interface is configured to support the communications of multiple controller units of the multi-processors system. For a PCIe interconnect this can be achieved by using a PCIe media interface. This allows the one or more physical network ports to which a media interface provides an interface to be shared by multiple processors having controller units configured in accordance with the present invention. In a system with PCIe multi-root capability the media interface is preferably a PCIe MR-IOV device. A data processing system (multi-processor or otherwise) can support multiple media interfaces, each of which could provide access to a different network—a controller unit simply addresses whichever media interface is appropriate for the given communication operation.

The advantages of sharing a media interface between multiple controller units within a data processing system include reduced power requirements due to the need for fewer PHYs, and the requirement for fewer network switch ports for the data processing system.

Note that the routing of all EoI data packets is performed at the interconnect level. Each controller unit is configured to cause interconnect data packets to be formed with an appropriate interconnect header such that each network data packet reaches its target endpoint. For example, network data packets directed to a controller unit at another processor of a multi-processor system are encapsulated and routed over the interconnect (which may comprise one or more links, such as HyperTransport and PCIe links) to the controller unit of the other processor. Network data packets directed to a remote data processing system accessible over a network are encapsulated and routed over the interconnect to the appropriate media interface for transmission onto the network.

SERDES circuitry configured to perform the physical signalling of data packets over the interconnect is preferably provided at the processor. The controller unit and processor are configured so as to allow the controller unit to communicate data over the interconnect by means of the SERDES circuitry. Preferably the controller unit maintains one or more lookup tables which include the correspondence between network addresses and device addresses on the interconnect. For example, data packets directed to a network address on the network to which the media interface provides an interface would be directed to the device address of the media interface on the interconnect; data packets directed to a network address corresponding to an endpoint of an application executing on another processor would be directed to the device address of the controller unit of that processor. The device addresses may or may not be in the same address space as the physical memory of the data processing system.

Figure 5A:
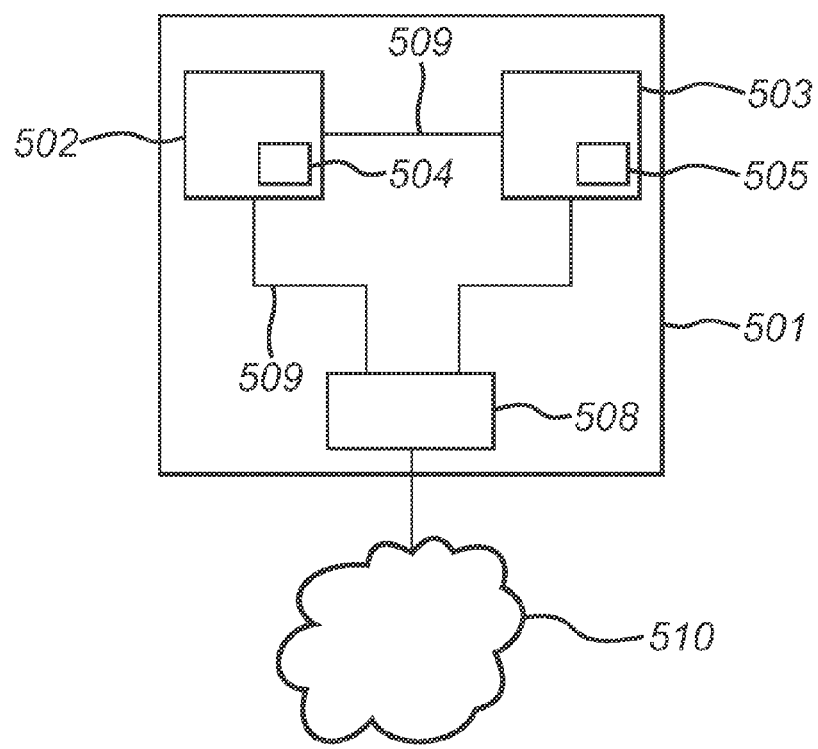
FIGS. 5a and 5b are schematic diagrams of multi-processor data processing systems having a network interface device configured in accordance with the present invention.
Figure 5B:
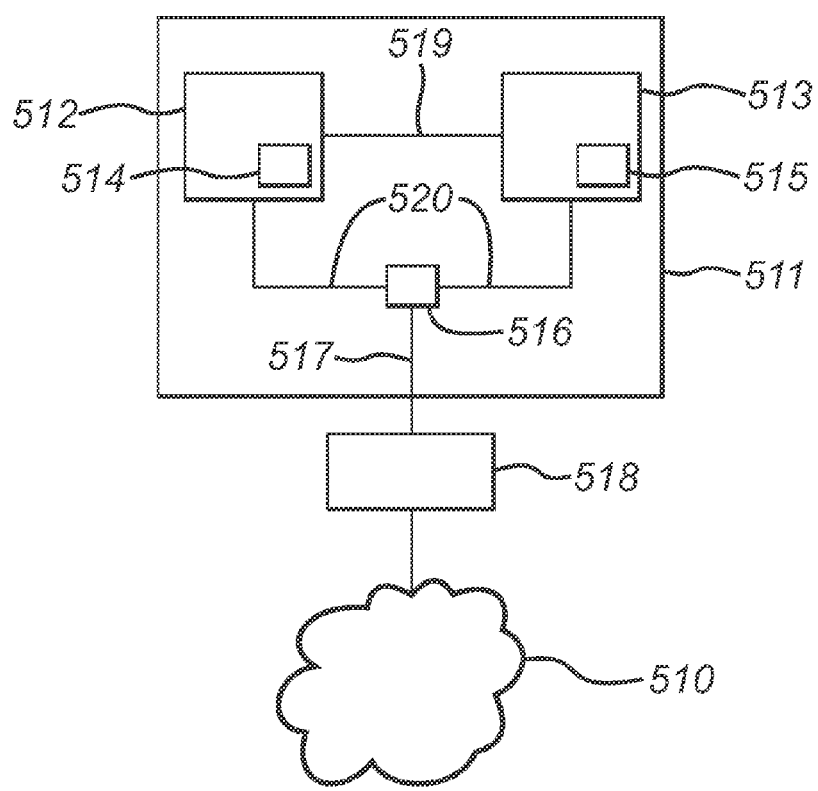

Two implementations of an Ethernet network interface device configured in accordance with the principles of the present invention are shown in FIGS. 5a and 5b.

In FIG. 5a, data processing system 501 comprises two processors 502, 503, each of which have controller units 504, 505. Media interface 508 is coupled to each processor by means of a CPU interconnect fabric 509, which could be a HyperTransport link.

In order for a first application executing at processor 502 to transmit data to a second application executing at processor 503, the first application makes a request for a transmission operation by the network interface device (formed by the controller unit and media interface) to an endpoint of the second application. This is typically effected by means of a software call from the first application to a device driver of the network interface device. Controller unit 504 forms an Ethernet data packet directed to the endpoint of the second application and causes the Ethernet data packet to be encapsulated in one or more interconnect data packets addressed so as to cause the interconnect data packets to be routed to controller unit 505 of processor 503. The interconnect data packets are routed directly between processors and not via the media interface. If required, controller unit 504 is configured to form an EoI header for the Ethernet data packet. At deserialisation circuitry of processor 503 the Ethernet data packet is extracted and the controller unit writes the data into the receive queue corresponding to the destination Ethernet address of the data packet.

Thus, a first application executing at processor 502 can transmit data to a second application executing at processor 503 in just the same way as if the second application were executing at a processor of a remote data processing system over network 510. However, because the Ethernet data packet is carried over a CPU interconnect between the processors, the data takes a low latency, high bandwidth data path. Note that FIG. 5a is purely schematic and the links between the various components of data processing system 501 may take any suitable configuration.

In FIG. 5b, data processing system 511 comprises two processors 512, 513, each of which have controller units 514, 515. This implementation is similar to the one shown in FIG. 5a, but in this case media interface 518 is a peripheral device supported on peripheral data bus 517, which could be a PCIe data bus. An I/O hub or switch 516 is therefore required to provide an interface between the peripheral data bus and each processor. Communications between processors 512 and 514 are preferably directly effected over interconnect fabric 519 (such as HyperTransport) in just the same way as described above for FIG. 5a. However, the interconnect between processor 512 and media interface 518 is formed of two links: a CPU data bus 520 (which could be a CPU interconnect such as HyperTransport, or another type of data bus such as a front side bus of processor 512) between the processor and I/O hub, and a peripheral data bus such as PCIe between the I/O hub and the media interface. Interconnect data packets destined for the media interface are transmitted onto the CPU data bus and then translated at the I/O hub into data packets suitable for transmission onto the PCIe bus. Preferably the CPU data bus is a CPU interconnect and, most preferably, the I/O hub is accessible to the processor via that CPU interconnect.

As mentioned above in relation to FIG. 2, a processor comprising a controller unit which forms part of a network interface device with a media interface supported at a peripheral data bus may itself include the appropriate SERDES circuitry to allow the processor to read and write directly to from and to the peripheral data bus. In the case in which the peripheral data bus is a PCIe data bus, the controller unit could itself be a PCIe device addressable over the PCIe data bus. An I/O hub is not required if the processor/controller unit can communicate directly over the peripheral data bus since, in order to communicate with a media interface, a controller unit could transmit suitable data packets encapsulating Ethernet data directly onto the peripheral data bus. A processor comprising a controller unit configured to communicate with a media interface as well as one or more other processors comprising controller units would therefore be capable of, in dependence on the destination of the data packet, encapsulating Ethernet data packets in data packets suitable for transmission over either a CPU interconnect or a peripheral data bus.

FIG. 5b is purely schematic: each processor may have its own I/O hub and the links between the various components of data processing system 511 may take any suitable configuration.

Note that since data transfers between controller units at the same data processing system (e.g. processors at a multi-processor computer system or blade of a blade server) do not traverse the media interface, the encapsulated network data packets may not be fully formed in accordance with the link layer network protocol before arriving at the destination controller unit (checksums and other offloads could be performed at the media interface).

Split PCIe Device

A novel split PCIe device architecture will now be described which is the preferred architecture for a PCIe network interface device configured in accordance with the present invention.

It is advantageous if the network interface device formed by the controller unit and media interface appear to the data processing system (and software running on it) as a regular PCIe device. This helps to maintain compatibility with existing software and hardware. In some embodiments of the present invention PCIe host circuitry is not provided at the processor, and so the controller unit is not provided with any PCIe logic. In order to provide a PCIe network interface device for such a data processing system, the media interface is provided with the PCIe logic.

Figure 6:
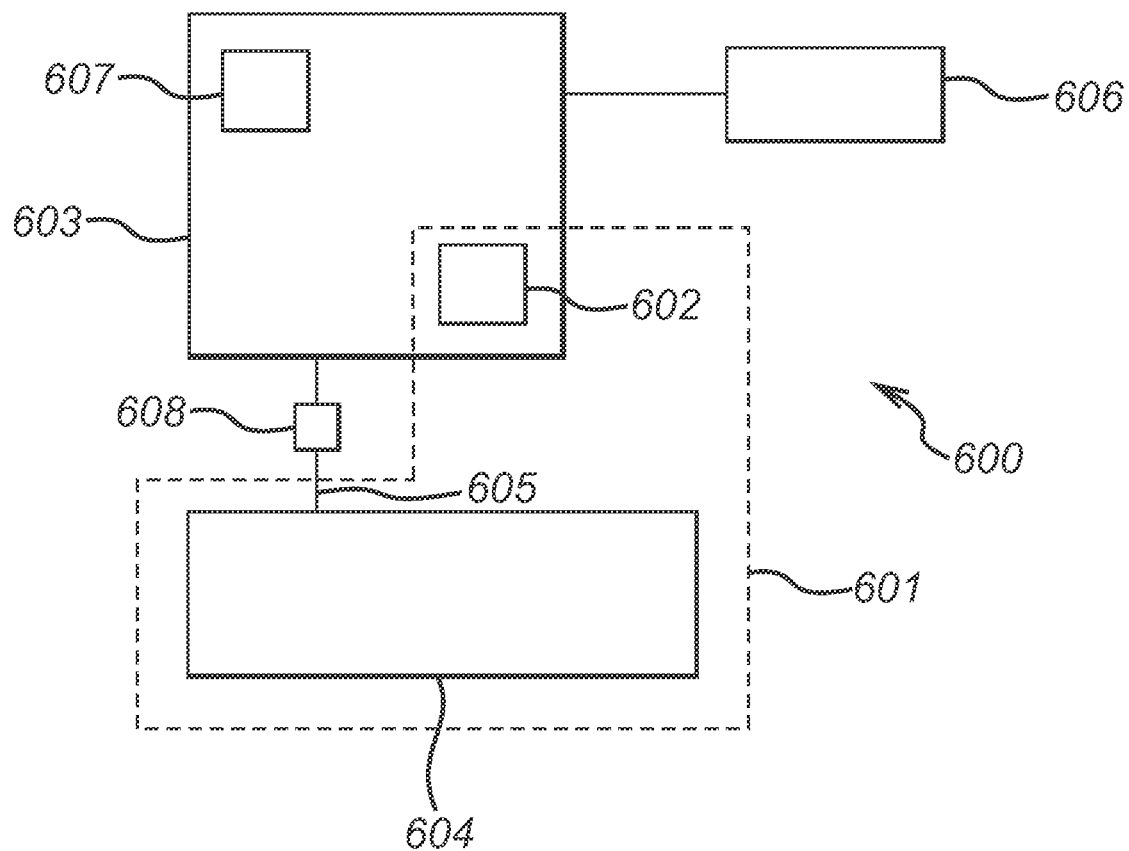
FIG. 6 is a schematic diagram of a PCIe device having a split architecture in accordance with the teachings of the present invention.

FIG. 6 shows a data processing system 600 comprising a PCIe device 601 (which may not be a network interface device) having two parts: a controller unit 602 at processor 603 and an interface unit 604 supported on PCIe data bus 605. The PCIe data bus is typically accessible to the processor by means of an I/O hub 608. The controller unit 602 comprises at least part of the logical functionality of the PCIe device and is configured to access memory 606 by means of an appropriate function of the processor (such as a memory management unit). Preferably the controller unit also has access to the cache 607 of the processor, which is configured to store copies of some of the data held at memory 606. The cache of a processor can be considered to be at its memory management unit (that part of the processor which provides access to host memory). It is advantageous to provide at the processor those functions of the device which benefit from low latency access to host memory 606 and processor cache 607.

Interface unit 604 is a PCIe device in the sense that it is physically supported at the PCIe data bus over which it can communicate by means of its PCIe host logic. Controller unit 602 is configured to support one or more control apertures. A control aperture is a physical address range that a device responds to—in other words, software running at the data processing system can interact with a device by reading from and writing to addresses within the device's control aperture(s).

Interface unit 604 is configured to support one or more Base Address Registers (BARs), which in accordance with the PCI Express specification represent the control apertures for a PCIe device. The Base Address Register a BAR refers to identifies the starting address of a control aperture. The base address of at least one of the BARs supported at the interface unit is configured to lie within the controller unit's control aperture such that when software running at the data processing system reads or writes into the address range advertised by the BAR of the interface unit, those reads or writes are actually directed to the control aperture of the controller unit. In other words, at least part of the physical address range advertised by the interface unit as being allocated to it is actually allocated to the controller unit. Since host software running at the data processing system obtains the address range of the control aperture of the PCIe device from a BAR of that device, the host software will use the address range allocated to the controller unit to interact with the PCIe device formed of both the controller unit and the interface unit.

Typically, a Basic Input/Output System (BIOS) of the data processing system at which the PCIe device is supported allocates the address ranges to be used as control apertures by each device in the system and programs each device as necessary to use them. These actions can be performed at startup of the data processing system.

The controller unit is preferably configured to handle interrupts for the PCIe interface unit. Since host software programs perform the configuration of device interrupts at the peripheral PCIe device (in this case, the interface unit), this can be achieved by configuring the interface unit to forward updates to its interrupt registers to the controller unit so that the controller unit can directly raise interrupts at the processor itself.

Further provision may be made to allow a split PCIe device as described above to support legacy I/O BARs. Legacy I/O BARs allow PCIe devices to be backwards compatible with legacy reads and writes directed to legacy device address ranges. These can be handled by configuring the interface unit to provide an indirection for reads and writes directed to the legacy I/O BAR onto a control aperture of the controller unit.

The registers of the legacy I/O BAR are arranged to receive reads and writes to the legacy registers of the network interface device and map those reads and writes into reads and writes to a control aperture of the controller unit. The mapping of reads and writes to legacy registers of the interface unit into reads and writes to the control aperture of the controller unit may be a direct correspondence, an indirect mapping or some other mapping. There can be separate indirections for each read and write, or indeed multiple indirections for each read and write to a register of the legacy I/O BAR.

A legacy read or write to a legacy register of an interface unit as described herein therefore becomes a memory read or write over the PCIe bus (and possibly additional interconnect links to reach the processor) to the controller unit. This avoids the need for logic at the interface unit configured to handle legacy I/O reads and allows the controller unit to maintain control of reads and writes to the PCIe device.

The interface unit may be a single root input/output virtualised (SR-IOV) or multi root input/output virtualised (MR-IOV) PCIe device supporting one or more physical functions (PFs) and virtual functions (VFs).

For certain types of split PCIe device in a multi-processor data processing system or blade server, an interface unit may be configured to support multiple controller units, with each controller unit being at a different processor. The interface unit 604 is therefore configured to support one or more BARs for each controller unit, the base address of at least one of the BARs for a particular controller unit being configured to lie within the control aperture of that controller unit. Similarly, an interface unit can be configured to handle legacy I/O BARs for multiple controller units in the manner described above.

Note that the interface unit preferably further supports config accesses, VPD (Vital Product Data) and the boot ROM for the device.

As applied to a PCIe network interface device configured in accordance with the present invention, interface unit 604 is the media interface and controller unit 602 is the controller unit. In the preferred embodiments of the present invention the controller units and media interfaces described herein with respect to FIGS. 2 to 9 are PCIe devices having a split PCIe device architecture.

Implementations of a Controller Unit at a Processor

Figure 7:
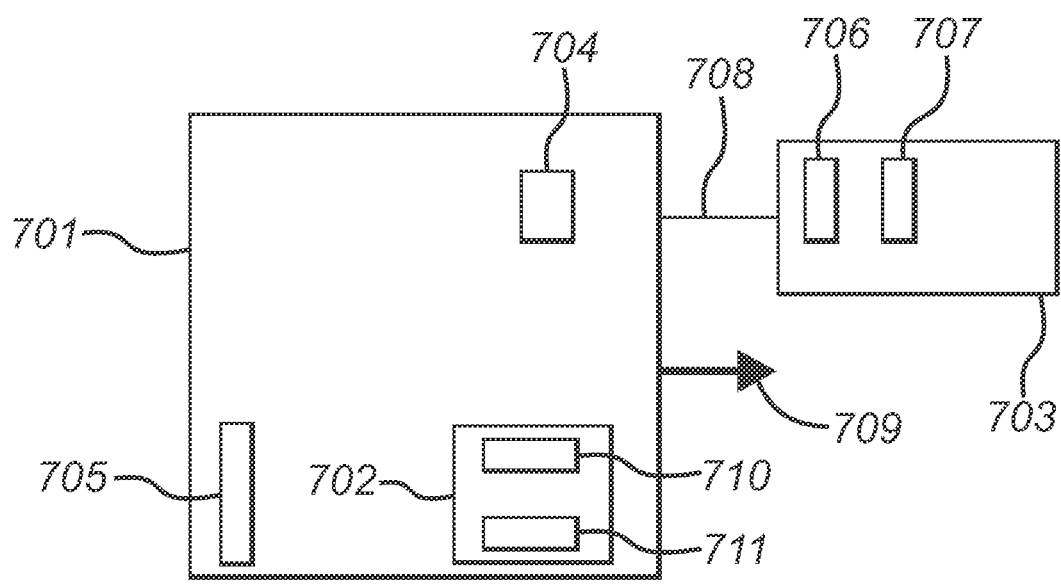
FIG. 7 is a schematic diagram of a controller unit configured in accordance with the present invention.

A schematic diagram of a preferred implementation of a controller unit at a processor is shown in FIG. 7. As described in relation to FIGS. 2 and 3, controller unit 702 is configured to handle the logical aspects of transmit and receive operations and is a controller of the network interface device formed by the controller unit and a media interface, which provides physical access to the network. Controller unit 702 is supported at a processor 701, which is the central processing unit (CPU) of a data processing system and therefore has access to host memory 703 and at least one data bus 709 (e.g. a CPU interconnect) by means of which the devices of the data processing system are accessible (such as a media interface on a peripheral data bus). Memory 703 may be accessible to the processor over a dedicated data bus 708. Further memory may be accessible to the processor over data bus 709. Data buses 708 and 709 may be one and the same data bus. Note that processor 701 may comprise multiple processing cores which share a single controller unit 702.

The controller unit further comprises encapsulation circuitry 711 configured to perform (a) the encapsulation of network data packets formed at the controller unit in data packets suitable for transmission over data bus 709, and (b) the extraction of network data packets from data packets received over data bus 709. This encapsulation and extraction of network data packets is performed in accordance with the EoI protocol described above in relation to FIG. 4.

Processor 701 preferably includes at least one cache 705 configured to store copies of data retained in host memory including 703. Cache 705 of a processor can be considered to be at memory management unit 704. The cache provides low latency access for the processor to data required during its operation. Most preferably the cache is an on-chip cache shared by all of the processing cores of the CPU. It is advantageous to configure the processor to allow the controller unit to access cache 705 so that the controller unit can access data with even lower latency than over memory bus 708.

A CPU often performs at least some of the data and protocol processing of network data packets being formed for transmission over a network due to the processor supporting the threads of the software applications and network stacks handling the network protocols in accordance with which the data packets are being formed. Such software network stacks typically perform the initial formation of data packets at higher layers of the OSI model (such as TCP/IP data packets), before passing the partially-formed data packets to the network interface device for completion of the network data packets at lower layers (such as Ethernet) and hardware offloads (such as TCP checksum offload). Since the cache of a CPU typically comprises data frequently or recently used by the processor, there is therefore a good likelihood that at least some of the data required by a controller unit to complete a given network data packet will be found at the cache.

As a result, it is advantageous if controller unit 702 is configured to, when requiring data from host memory, first access the cache for that data and, if the data is not to be found at the cache, subsequently read the data from host memory. In particular, it is preferable if the controller unit is configured to first access the cache for packet data stored at a transmit queue in host memory. The controller unit is preferably configured to, if the packet data required by the controller unit is not found at the cache, not copy that data into cache 605 when it is read from the host memory. Because transmit data is not usually required again by the controller unit or processor once it has been transmitted, this avoids polluting the cache with data which is unlikely to be subsequently required. The controller unit is preferably configured to, if the packet data required by the controller unit is found at the cache, cause the cache lines at which the packet data is resident in the cache to be invalidated. Since the packet data is unlikely to be subsequently required by the controller unit or processor, this frees up space in the cache and avoids write-backs of packet data to the host memory, which saves bus and memory bandwidth. Most preferably the decision whether or not to invalidate cache lines is made under the control of software.

Similarly, on data packets being received over the network, it is the network interface device which typically processes received data packets at the lower network protocol layers before writing data in the packets into host memory to allow a software network stack executing at the processor to complete protocol processing of the received data packets. One or more processes of a software network stack are therefore likely to access data of a received data packet when the network stack performs protocol processing of that data packet. It is therefore advantageous if the controller unit is configured to, on writing received packet data to host memory, write at least some of that data into the cache where it can be accessed more efficiently (than in host memory) by processes subsequently executing at the processor. The controller unit may be configured to write only selected parts of a received data packet to the cache, the selection preferably being determined by the protocol(s) with which the data packet is in accordance. The selected parts of the received data packet could be the headers of the data packet. The controller unit could be configured to, for data packets of a predetermined set of network protocols, not write any parts of the data packets to the cache. Most preferably the controller unit is configured by management software in dependence on the configuration of software processes running on the data processing system.

In relation to control data in particular, it is preferable that the controller unit is configured to first access the cache when performing a read of control data and to write control data to the cache when performing a write of control data to the host memory. Control data can include descriptors, notification events and data from address translation tables and forwarding tables. Forwarding tables typically comprise information which determines how a network interface device is to handle: (a) received network data packets (i.e. to which receive queue(s) data of a received data packet should be delivered, and/or to which other network devices the data packet should be sent) and (b) network data packets for transmission (e.g. which destination address information to write to a data packet so as to cause that data packet to be routed to the appropriate endpoint). Preferably forwarding tables 706 and address translation tables 707 required by the controller unit are stored at host memory 703 rather than at a dedicated memory of the controller unit. This allows the controller unit to take up less room on the processor die and does not adversely affect the performance of the network interface device since the controller unit has access to the processor's low latency connection to host memory and cache. Generally, the controller unit stores its state in host memory. Alternatively, the controller unit could be provided with its own dedicated Level 1 cache 710 in which to store control data for data flows handled by the controller unit.

For a conventional network interface device supported at a peripheral data bus, memory address translations between the physical and virtual domains of a data processing system are typically performed at an I/O Memory Management Unit (IOMMU) on the data path between the network interface device and host memory. Since a controller unit is located at the processor and not at a peripheral device, an IOMMU (if present) does not lie between the controller unit and host memory. It is therefore preferred that the controller unit is configured to use the memory management unit (MMU) 704 of the processor for address translations. The memory management unit is arranged to perform memory address translations for reads and writes issued by the controller unit from and to host memory. Providing the controller unit with access to the MMU allows the controller unit to handle virtual memory addresses. This means that both trusted software domains (such as a kernel or hypervisor) and untrusted software domains (such as a guest operating system or application) can identify host memory buffers to the controller unit (such as a transmit queue) because the controller unit can use both physical and virtual memory addresses. Furthermore, providing the controller unit with access to the MMU of the processor avoids requiring the controller unit to manage separate I/O address spaces and simplifies the implementation of direct device access by untrusted software domains in virtualised systems and systems which utilise user-level networking.

In order to allow the MMU to perform address translations on behalf of the controller unit, the controller unit maintains a correspondence between each virtual network interface device (VNIC) of the physical network interface device represented by the controller unit and the address space of the respective virtualised domain for which the VNIC has been allocated. This enables the controller unit to identify to the MMU to which virtual address space a memory read or write relates.

In order to prevent devices overwriting data in a transmit queue at host memory, a data processing system is usually configured to pin a page of memory when data for transmission has been written to that page of memory. This reserves the memory page and prevents the page from being reassigned. Such pinning is not necessary for transmit operations performed by a network interface device configured in accordance with the present invention. It is instead preferred that memory pinning is not performed and, if an address translation fails (e.g. because the memory page has been written to a page file at a storage device and reassigned), the MMU is configured to raise an error to indicate that the virtual address is not present in host memory. A translation failure is therefore handled as a page fault by the processor.

This allows failures in translation to be handled at a data processing system in the following manner. When the controller unit issues reads for transmit queue data at host memory that are translated by the MMU and the translation fails, the MMU raises a page fault error at the controller unit for the page of memory to which the read relates. In response, the controller unit pauses the transmit queue associated with the transmit operation to which the read relates, and sends a notification to a software entity (typically a device driver of the network interface device). Software causes the page to be made available in memory (this is typically handled by a privileged mode software entity—such as part of the kernel or hypervisor—of the data processing system). Once the page has been made available the software handling the transmit operation un-pauses the transmit queue and causes the controller unit to retry issuing the read and continue with processing data at the transmit queue.

By reducing the amount of memory that needs to be pinned, the privileged software (such as the kernel or hypervisor) which manages the host memory has more freedom to write pages out of the memory back into the data store (such as a page file at a non-volatile storage device). The above mechanism does not introduce any further complexity into the MMU and reduces complexity and the CPU overhead on the transmit path because no pinning operations are required.

The pinning of buffers at host memory can also be minimised during receive operations by maintaining a pool of pinned receive buffers at host memory to which data received at the controller unit can be written to in case of a failed translation of the target address of the data. This removes the need to pin the pages of receive queues at host memory. Preferably, when the controller unit issues writes of received packet data to a receive queue in host memory and the translation of the target address in that receive queue fails at the MMU, the received packet data is written to an alternative buffer in host memory which is reserved as a fall-back for received data packets which cannot immediately be written to the appropriate receive queue. This is important because, unlike in the case of packet transmission, it is not possible to pause a receive queue until the address translation succeeds—new data packets may be received for the receive queue at any time. After writing the received data packet to the alternative buffer, the controller unit continues processing received data packets, issuing write requests as appropriate in order to copy the received data into its respective receive queue.

When an address translation fails, software handling the receive operation at the data processing system is notified by the controller unit and responds by re-allocating one or more memory pages for use by the respective receive queue. The software also accesses the alternative buffer in order to process the received data packet which could not be written to its receive queue. There could be a set of pinned alternative buffers for each software domain of the data processing system.

Implementations of a Media Interface

As described above in relation to FIGS. 2 and 3, a media interface provides the physical interface to a network for a controller unit. A media interface may be supported on a peripheral data bus such as PCIe, or may be directly coupled to a processor comprising a controller unit by means of a CPU interconnect. Since packet-based routing is employed on the interconnect(s) between the controller unit and media interface, a single media interface is preferably operable to support transmission and reception operations for multiple controller units.

Figure 8:
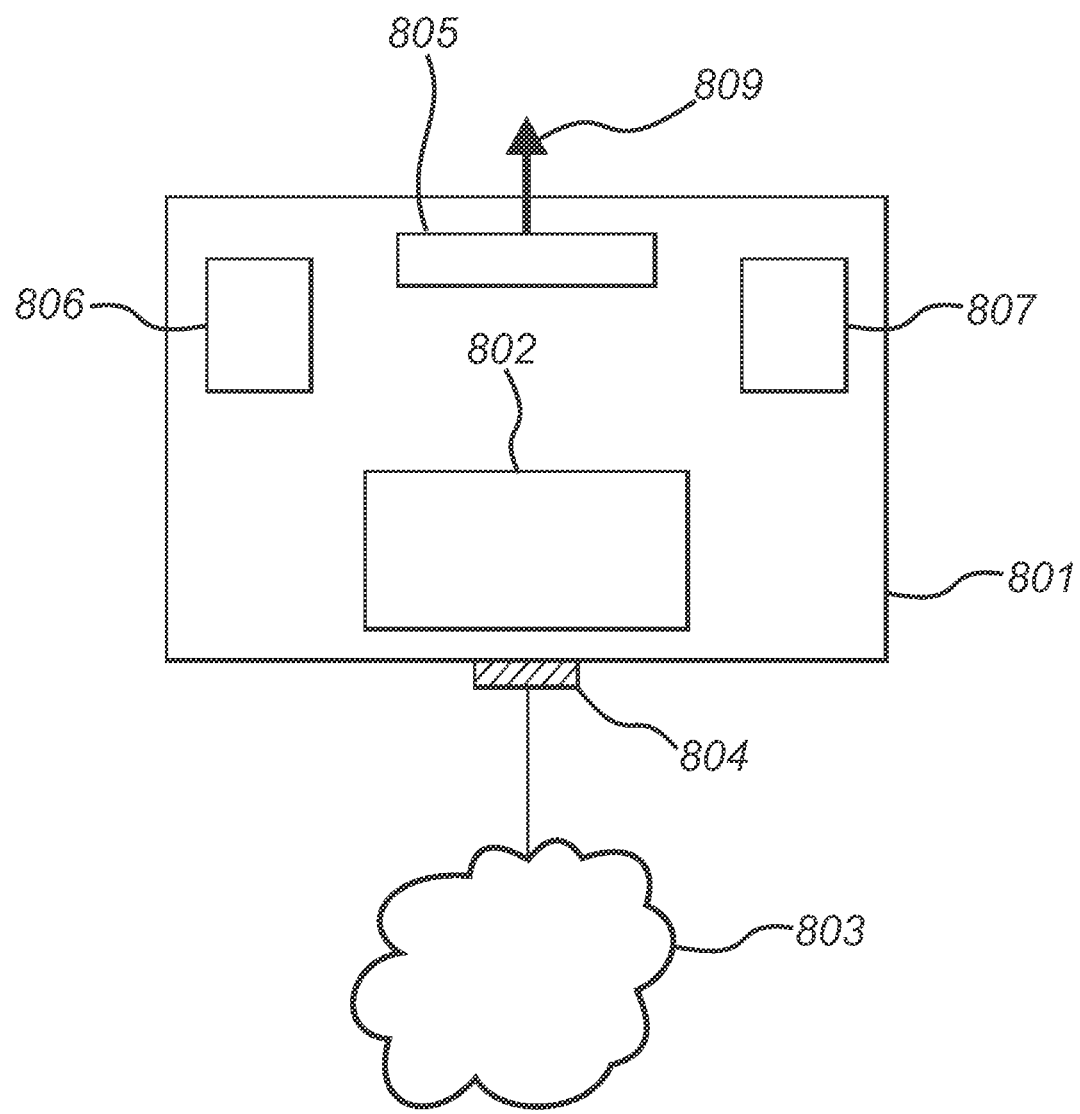
FIG. 8 is a schematic diagram of a media interface configured in accordance with the present invention.

FIG. 8 shows a schematic diagram of a media interface configured in accordance with the present invention. Media interface 801 comprises a PHY 802 configured to perform the physical signalling of data packets over network 803 and encapsulation circuitry 805 configured to allow the media interface to communicate network data packets over data bus 809. Encapsulation circuitry 805 is configured to perform (a) the encapsulation of network data packets received over the network in data packets suitable for transmission over data bus 809 to a controller unit, and (b) the extraction of network data packets for transmission over the network from data packets received over data bus 809 from a controller unit. This encapsulation and extraction of network data packets is performed in accordance with the EoI protocol described above in relation to FIG. 4.

It is advantageous if the media interface includes a management controller 806 for the network interface device. Management controllers allow the network interface device to be remotely managed by means of commands received over the network. By locating a management controller at the media interface, the management controller can remain powered during low power states of the data processing system when the processor is powered down. The management controller could be configured to communicate with a baseboard management controller (BMC) at the baseboard of the parent data processing system. This allows the data processing system to be remotely managed by commands received over the network, as is well known in the art. In systems having multiple controller units sharing a media interface, management controller 806 is configured to handle management commands on behalf of all controller units.

It is common for the calculation of checksums to be offloaded to a peripheral network interface device where they can be efficiently performed at dedicated circuitry, such as a state machine. A media interface preferably includes circuitry 807 configured to perform checksum calculations appropriate to the network protocol in use over the network—for example, for an Ethernet network the checksum would be a 32 bit CRC checksum.

In general, the media interface performs the functions specific to the network protocol (e.g. Ethernet) in use over the network. Most other functions are performed at the controller unit. However, it is often advantageous for certain logical operations to be performed at the media interface, close to the physical network port 804. To give some examples, the division of functionality between a controller unit and media interface for the following protocols is preferably:

link layer flow control such as IEEE 802.1Qbb (Per-Priority Pause) is preferably performed at a media interface;

IEEE 802.1Qaz (Enhanced Transmission Selection) is preferably implemented at the controller unit;

IEEE 802.1Qau (Congestion Notification) is preferably implemented at both the controller unit and the media interface.

It is preferable that other functions and any protocol processing offloaded from software network stacks running on the parent data processing system are performed at the controller unit. This includes:

Checksum offloads for protocols such as IP, TCP, UDP, iSCSI and Fibre Channel over Ethernet (FCoE)
TCP offloads, processing for the iWARP architecture
iSCSI, FCoE offloads
TCP segmentation offloading (TSO), large receive offload (LRO) and receive side scaling (RSS)
NIC virtualisation In some embodiments the media interface does not include a PHY, which is instead accessible to and controlled by the media interface over an interface. For example, the media interface could be integrated with a chipset (e.g. at an I/O hub) supporting the processor which comprises the controller unit, and the PHY could be located at the physical network port of the data processing system. Such media interfaces operate as described herein but with the physical signalling being performed under the control of the media interface at a PHY separate from the media interface integrated circuit itself.

Application to a Blade Server

A split network interface device configured in accordance with the present invention finds particular application in a blade server. A blade server is a modular computer system design having multiple blades, each of which supports one or more processors, a memory and an I/O interface for communication with other blades and a chassis. Generally, the I/O interface of each blade is provided by a network controller utilising a high speed serial data interface, such as an IEEE 10GBASE-KR interface, at the physical layer. The chassis typically supports a switch to connect the blades and to provide access to the wider network for the blades of the blade server. Alternatively the I/O interface of each blade is provided by a peripheral data bus, such as PCIe, and the blades share one or more network controllers located at the chassis. In such blade servers the network controllers are typically PCIe MR-IOV devices.

Each blade is a data processing system in its own right and can support one or more operating systems—generally a blade has a virtualised architecture in which there are multiple guest operating systems (e.g. virtual machines) supported by a privileged mode software domain (e.g. a hypervisor). A single blade server can therefore support many operating systems, each of which in turn can support multiple applications wishing to communicate with other applications executing at other processors within a blade, at processors on other blades, or on other servers or blade servers accessible over a network.

Figure 9:
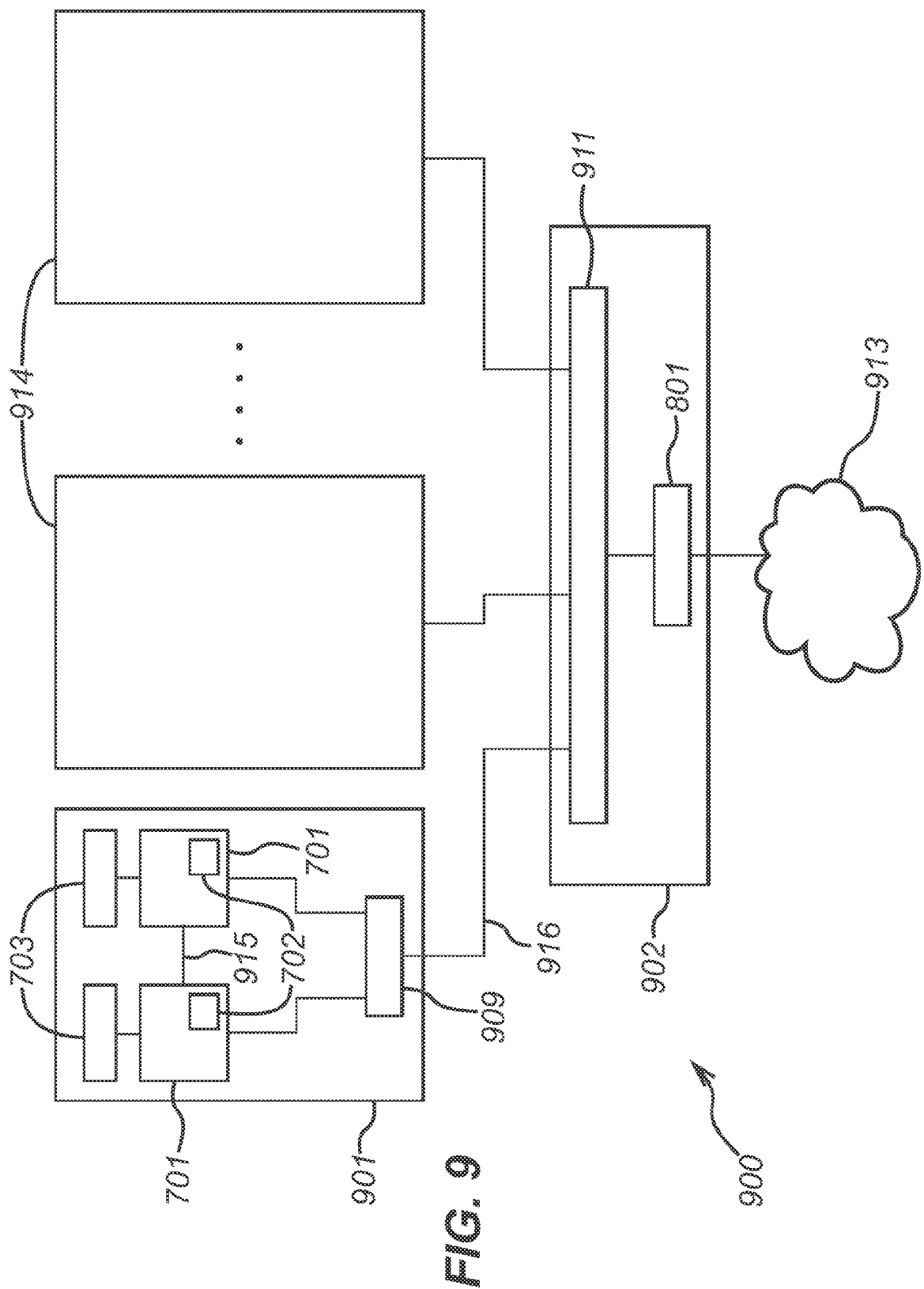
FIG. 9 is a schematic diagram of a blade server having a media interface and multiple controller units configured in accordance with the present invention.

A schematic diagram of a blade server configured in accordance with the present invention is shown in FIG. 9. The blade server 900 comprises multiple blades 901, 914 each having one or more processors 701 which include a controller unit 702. A blade also includes one or more memories 703 accessible to the processor(s). The blades are supported at a chassis 902 which includes a media interface 801 operable to provide access to a network 913. The media interface is configured to provide access to network 913 for multiple blades of the blade server. In other words, a controller unit at any of the processors on any of the blades of the server can be configured to communicate by means of the media interface. Chassis 902 could include multiple media interfaces, each of which might provide access to, for example, a different network or subnet.

The processors of a multi-processor blade are connected by a CPU interconnect such as HyperTransport or QPI. This allows the controller units to communicate directly with one another by means of the high speed CPU interconnect, as is described above in relation to FIG. 5*a*. The media interface is supported at a data bus 916 of the blade server, such as PCIe, which also forms the interconnects between the blades of the blade server. Each blade may include one or more I/O hubs 909 to allow each processor to communicate over the data bus. Most preferably each processor supports an interface to the data bus, in which case I/O hub(s) 909 are not required.

By providing the media interface with one or more forwarding tables which identity the set of network endpoints that each controller unit supports, the media interface can be configured to perform the internal routing of data between network endpoints on different blades of the blade server. For example, if the data bus is a PCIe data bus, the media interface could be an MR-IOV PCIe device configured to support multiple PCIe roots (typically one per blade). On receiving an EoI encapsulated network data packet over the PCIe bus from a controller unit at a first blade for a network endpoint supported at a processor at a second blades, the media interface would, using the forwarding tables, determine that the network endpoint is supported at a controller unit of the second blade and then route the network data packet over the PCIe data bus to that controller unit. In this manner, the media interface could handle the routing of data packets at the network protocol level (e.g. link layer Ethernet) between blades of the blade server as well as between the network and the blades.

However, it is preferable if data bus switch 911 is provided at the chassis in order to perform the internal routing of data between the blades of the blade server, rather than leaving the media interface to perform inter-blade routing. This means that internal data transfers between blades of the blade server do not have to traverse the connection of the media interface to the data bus, which is a particular bottleneck if the media interface is configured to perform all routing. Preferably, the data bus is a PCIe data bus and the switch is a PCIe switch. A PCIe switch can provide a very large bandwidth in comparison to performing switching at an individual PCIe device (such as a media interface) or external to a data processing system at an edge switch on network 913 (e.g. if the blade server were configured in accordance with the Virtual Ethernet Port Aggregator protocol, or VEPA).

In a first embodiment, data bus switch 911 is configured to perform routing of data packets on data bus 916 in dependence on the address information in the headers of the data bus packet—i.e. at the level of the data protocol in use over the data bus. Since the routing is performed by the switch at the level of the data bus protocol, the latency of internal data transfers is improved. However, such an arrangement requires that each forwarding table 706 of each controller unit 702 comprises the correspondence between the device addresses of each controller unit of the blade server and the addresses of the network endpoints supported by each of the controller units. This allows each controller unit to determine if a particular network endpoint is supported at the blade server and to address each data packet sent over the data bus accordingly.

For example, suppose an application at a processor of a first blade has data to transmit to an application at a processor of a second blade, the blades and media interface being interconnected by a PCIe data bus and providing an interface to an Ethernet network. The controller unit of the first processor forms an Ethernet data packet directed to the endpoint of the application at the processor of the second blade. In forming one or more EoI PCIe data packets encapsulating the Ethernet data packet, the controller unit will lookup in its forwarding table the device address for the controller unit at the processor of the second blade and insert that device address into the routing information of the PCIe data packet(s). On arrival at the PCIe switch, the switch identifies the target device (the controller unit at the processor of the second blade) and routes the PCIe data packet(s) accordingly. Note that if the network endpoint is not supported at the blade server (i.e. it is a remote network address), the controller unit would use the device address of the media interface.

In a preferred second embodiment, data bus switch 911 is configured to handle the routing of data packets at the network protocol level (e.g. link layer Ethernet) between blades of the blade server. The data bus switch is therefore configured to parse at least some of the header information of the network data packet encapsulated within EoI PCIe data packets received at the switch. Only the switch is required to support a forwarding table comprising the correspondence between the device addresses of each controller unit of the blade server and the addresses of the network endpoints supported by each of the controller units. If within a blade data is to be routed between controller units without traversing the switch, each controller unit need only support a forwarding table for the network endpoints supported at its blade. This reduces the size of the forwarding tables required for each controller unit and simplifies the control plane of the blade server.

For example, suppose an application at a processor of a first blade has data to transmit to an application at a processor of a second blade, the blades and media interface being interconnected by a PCIe data bus and providing an interface to an Ethernet network. The controller unit of the first processor forms an Ethernet data packet directed to the endpoint of the application at the processor of the second blade. In forming one or more EoI PCIe data packets encapsulating the Ethernet data packet, the controller unit recognizes that the Ethernet address to which the data packet is to be directed is not supported at the first blade and, as a result, will insert the device address of the PCIe switch into the routing information of the PCIe data packet(s). On arrival at the PCIe switch, the switch parses the PCIe data packet(s) and identifies the target Ethernet address from the network data packet contained therein. The switch then looks-up in its forwarding table the device address corresponding to the target Ethernet address (i.e. the controller unit device at the processor of the second blade which supports that Ethernet address) and updates the PCIe data packet header accordingly before pushing the data packet onto the appropriate PCIe data bus.

The second embodiment also improves performance for multicast traffic because such traffic only needs to be transferred from a controller unit or media interface to a data bus switch once: the switch will transmit the multicast traffic onto each of the appropriate endpoints. In the first embodiment a controller unit must individually transmit multicast traffic to each recipient in the blade server because routing at the switch is performed at the data bus layer.

It is advantageous if the media interface is a PCIe device and the data bus interconnecting the blades is a PCIe data bus because this generally reduces the number of PHYs required in comparison to a conventional blade server architecture, and hence reduces the power requirements of each blade. A conventional blade server typically has a serial I/O interface (PHY #1) to the backplane at each blade, with each I/O interface being supported at the blade by a PCIe bus (PHY #2). By using the PCIe data bus as the backplane of the blade server, PHY #1 is no longer required.

Most preferably the media interface is an MR-IOV PCIe device that supports the communications of each controller unit at the blade server. In other words, the MR-IOV media interface supports at least one physical function (PF) or virtual function (VF) for each blade of the blade server. It is most straightforward if each blade is assigned a PF and each controller unit of a blade is assigned a VF belonging to the PF of that blade. However, as will be apparent to a person of skill in the art of peripheral devices, other arrangements can be used.

Note that either a switch or mesh topology could be used for the connections between blades.

The essential blade server architecture described herein is compatible with either the Virtual Ethernet Bridge (VEB) or Virtual Ethernet Port Aggregator (VEPA) protocols. In the case of VEB, data transfers between network endpoints at the blades of a blade server operate as described above. In the case of VEPA, all switching between endpoints—even those supported at the same processor—is performed at an edge switch on network 913. If a VEPA protocol is imposed, the controller units, data bus switch and media interface are configured to pass all network data packets via the media interface to the relevant edge switch.

The data bus switch may or may not form part of the same integrated circuit as the media interface.

The embodiments described herein with reference to blade systems apply equally to other multi-processor systems which do not have physical blades but which nonetheless can be considered to comprise multiple data processing systems.

Note that in any embodiment described herein a media interface can support one or more physical network ports.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system comprising a central processing unit and a split network interface functionality, the split network interface functionality comprising:
    a first sub-unit collocated with or part of the central processing unit and configured to partially form a series of network data packets for transmission to an endpoint of the network by generating data link layer information for each of those packets according to a data link layer protocol of the network; and
    a second sub-unit external to the central processing unit and coupled to the central processing unit via an interconnect having a data link layer protocol different from that of the network, the second sub-unit being configured to receive the partially formed network data packets and to physically signal the series of network data packets over the network using the data link layer information generated by the first sub-unit.

2. A data processing system as claimed in claim 1, wherein the first sub-unit is configured to encapsulate each network data packet of the series in one or more interconnect data packets in accordance with the data protocol in use over the interconnect.

3. A data processing system as claimed in claim 1, wherein the first sub-unit is configured to transmit the interconnect data packets to the second sub-unit so as to cause the second sub-unit to signal the respective network data packets over the network.

4. A data processing system as claimed in claim 1, wherein the second sub-unit is configured to complete the formation of each of the series of network data packets at the data link layer of the network protocol in use over the network.

5. A data processing system as claimed in claim 4, wherein the second sub-unit is configured to complete the formation of each of the series of network data packets at the data link layer by calculating one or more checksums for each network data packet.

6. A data processing system as claimed in claim 1, wherein the second sub-unit is configured to physically signal the series of completed data packets over the network in accordance with the physical layer requirements of the network protocol in use over the network.

7. A data processing system as claimed in claim 1, further comprising a memory and/or cache coupled to the central processing unit and, at the central processing unit, a memory management unit configured to provide access to the memory and/or cache for the central processing unit and the first sub-unit.

8. A data processing system as claimed in claim 7, wherein the memory and/or cache is configured to hold a transmit queue comprising data for transmission over the network and the first sub-unit is configured to access the transmit queue by means of a read request to the memory management unit and form the series of network data packets using the data for transmission over the network.

9. A data processing system as claimed in claim 1, wherein the second sub-unit is operable to receive a series of network data packets over the network and the first sub-unit is configured to at least partially process each received network data packet at the data link layer of the network so as to extract data carried within the network data packet.

10. A data processing system as claimed in claim 9, further comprising a memory and/or cache coupled to the central processing unit and, at the central processing unit, a memory management unit configured to provide access to the memory and/or cache for the central processing unit and the first sub-unit,
    wherein the first sub-unit is configured to store at the memory a forwarding table comprising information such as to allow the first sub-unit to, for each received network data packet, route extracted data to one or more receive queues at the memory and/or another network device in dependence on the content of the received network data packet.

11. A data processing system as claimed in claim 9, wherein the second sub-unit is configured to encapsulate each received network data packet in one or more interconnect data packets in accordance with the data protocol in use over the data link of the interconnect proximal to the second sub-unit.

12. A data processing system as claimed in claim 9, wherein the second sub-unit is configured to transmit the interconnect data packets to the first sub-unit so as to cause the first sub-unit to at least partially process each received network data packet at the data link layer of the network and extract the data carried within received network data packet.

13. A data processing system comprising:
    a central processing unit, the central processing unit including a network interface controller, the network interface controller being configured to form intermediate data units by at least partially framing at the data link layer data for transmission over a network in accordance with a network protocol, each intermediate data unit including a destination network address for the data for transmission;
    a memory coupled to the central processing unit;
    a media interface connected to the network and configured to transmit fully-formed data packets over the network; and
    a first interconnect extending between the central processing unit and the media interface, the interconnect being formed of one or more data links;
    wherein the network interface controller is further configured to encapsulate said intermediate data units of the network protocol in interconnect data packets for transmission over the first interconnect, and the media interface is configured to extract the intermediate data units from the interconnect data packets received over the first interconnect and process the intermediate data units at the physical layer so as to complete the formation of data packets in accordance with the network protocol.

14. A data processing system as claimed in claim 13, wherein the network interface controller is configured to encapsulate each intermediate data unit in one or more interconnect data packets in accordance with the data protocol in use over the data link of the first interconnect proximal to the central processing unit.

15. A data processing system as claimed in claim 13, wherein the network interface controller is configured to cause the one or more interconnect data packets to be transmitted to the media interface so as to cause the media interface to transmit a fully-formed network data packet over the network.

16. A data processing system as claimed in claim 13, wherein the network interface controller is configured to write an encapsulation header to each of the interconnect data packets, the encapsulation header comprising information such as to allow the media interface to reassemble the respective intermediate data unit from the interconnect data packets.

17. A data processing system as claimed in claim 13, wherein the first interconnect comprises two data links:
    a first data link extending between the central processing unit and a translation unit; and
    a second data link extending between the translation unit and the media interface,
    the translation unit being configured to translate interconnect data packets framed in accordance with the data protocol in use over the first data link into interconnect data packets framed in accordance with the data protocol in use over the second data link, and vice versa.

18. A data processing system as claimed in claim 17, wherein the translation unit is configured to translate interconnect data packets by:
    removing framing data of the data protocol in use over the first data link and re-framing the one or more interconnect data packets in accordance with the data protocol in use over the second data link; or
    adding an additional framing layer about the one or more interconnect data packets in accordance with the data protocol in use over the second data link.

19. A data processing system as claimed in claim 17, wherein the first data link is a CPU interconnect and the second data link is a peripheral data bus.

20. A data processing system as claimed in claim 19, wherein the media interface is supported at the peripheral data bus.

21. A data processing system as claimed in claim 19, wherein the CPU interconnect is one of a HyperTransport interconnect, a QuickPath interconnect and a PCIe interconnect.

22. A data processing system as claimed in claim 19, wherein the peripheral data bus is PCIe.

23. A data processing system as claimed in claim 13, wherein the central processing unit further comprises a memory management unit configured to provide access to the memory for the central processing unit and the network interface controller.

24. A data processing system as claimed in claim 13, wherein the network interface controller is configured to, if the destination network address belongs to a process supported at the central processing unit, write the data for transmission directly to a receive queue at the memory without encapsulating that data in one or more interconnect data packets, the receive queue corresponding to the destination network address.

25. A data processing system as claimed in claim 24, wherein the network interface controller is further configured to not frame that data at the data link layer in accordance with the network protocol.

26. A data processing system as claimed in claim 23, wherein the memory is configured to hold one or more transmit queues comprising data for transmission over the network and the network interface controller is operable to access said data for transmission at its respective transmit queue by means of a read request to the memory management unit.

27. A data processing system as claimed in claim 23, wherein the memory management unit comprises a cache operable to store a copy of at least some of the data held at the memory, the cache being accessible to both the central processing unit and the network interface controller.

28. A data processing system as claimed in claim 27, wherein the cache is configured to store data recently accessed at the memory by the central processing unit.

29. A data processing system as claimed in claim 27, wherein the network interface controller is configured to, for any data for transmission that is available at both the memory and the cache, read that data for transmission from the cache in preference to reading the data from the memory.

30. A data processing system as claimed in claim 27, wherein the network interface controller is configured to, for data for transmission that is not available at the cache, read the said data from the memory and not write the data into the cache.

31. A data processing system as claimed in claim 29, wherein the network interface controller is configured to, on reading the data for transmission from the cache, invalidate the corresponding lines of the cache so as to allow other processes executing at the central processing unit to overwrite those lines.

32. A data processing system as claimed in claim 13, wherein:
    the media interface is operable to receive network data packets over the network and encapsulate the received network data packets in interconnect data packets for transmission over the first interconnect; and
    the network interface controller is configured to extract the received network data packets from the interconnect data packets and at least partially process at the data link layer each received network data packet in accordance with the network protocol so as to extract the data carried within each received network data packet.

33. A data processing system as claimed in claim 32, wherein the media interface is configured to encapsulate each received network data packet in one or more interconnect data packets in accordance with the data protocol in use over the data link of the first interconnect proximal to the media interface.

34. A data processing system as claimed in claim 32, wherein the media interface is configured to transmit the interconnect data packets to the network interface controller in order to cause the network interface controller to at least partially process each received network data packet at the data link layer and write the data carried within each received network data packet to at least one receive queue at the memory identified by a destination network address included within that received network data packet.

35. A data processing system as claimed in claim 34, wherein the central processing unit further comprises a memory management unit configured to provide access to the memory for the central processing unit and the network interface controller,
    wherein the memory management unit comprises a cache operable to store a copy of at least some of the data held at the memory, the cache being accessible to both the central processing unit and the network interface controller, and wherein the network interface controller is configured to, on writing the data carried within a received network data packet to a receive queue at the memory, write that data to the cache.

36. A data processing system as claimed in claim 32, wherein the network interface controller is configured to store at the memory a forwarding table comprising information such as to allow the network interface controller to, for each received network data packet, select in dependence on the destination network address one or more receive queues at the memory and/or another network device to which data of the received network data packet is to be routed.

37. A data processing system as claimed in claim 32, wherein the media interface is configured to write an encapsulation header to each of the interconnect data packets, the encapsulation header comprising information such as to allow the network interface controller to reassemble the respective network data packet from the interconnect data packets.

38. A data processing system as claimed in claim 24, wherein the central processing unit further comprises a memory management unit configured to provide access to the memory for the central processing unit and the network interface controller,
wherein the memory management unit is configured to, on receiving a request to access a virtual memory address from either the central processing unit or the network interface controller, translate that virtual memory address into a physical memory address of the data processing system and access that physical memory address.

39. A data processing system as claimed in claim 38, wherein the memory management unit is configured to, if a translation of a virtual memory address on behalf of the network interface controller fails, raise a page fault to the network interface controller.

40. A data processing system as claimed in claim 39, wherein the network interface controller is configured to, responsive to the page fault:
if the virtual memory address relates to a transmit queue, cause the transmit queue corresponding to that virtual memory address to be paused until the respective page has been rewritten to memory; or
if the virtual memory address relates to a receive queue, write the data of the received network data packet in respect of which the request was issued to a reserved buffer for retrieval by a protocol processing entity of the data processing system.

41. A data processing system as claimed in claim 13, further comprising:
a second central processing unit including a second network interface controller, the second network interface controller also being configured to form intermediate data units by at least partially framing at the data link layer data for transmission in accordance with the network protocol, each intermediate data unit including a destination network address for the data for transmission; and
a second interconnect extending between the second central processing unit and the media interface, the second interconnect being formed of one or more data links,
wherein the second network interface controller is configured to encapsulate intermediate data units of the network protocol in interconnect data packets for transmission over the second interconnect, and the media interface is configured to extract intermediate data units from interconnect data packets received over the interconnect and process the intermediate data units at the physical layer so as to complete the formation of data packets in accordance with the network protocol.

42. A data processing system as claimed in claim 41, wherein one or more data links of the second interconnect are shared with one or more data links of the first interconnect.

43. A data processing system as claimed in claim 41, wherein the network interface controller is configured to, if the destination network address of intermediate data units formed at the central processing unit is a network address supported at the second central processing unit, cause encapsulated interconnect data packets comprising the intermediate data units to be transmitted to the second network interface controller.

44. A data processing system as claimed in claim 41, wherein the media interface includes a management controller configured to handle management commands received for the network interface devices formed by (a) the media interface and the network interface controller and (b) the media interface and the second network interface controller.

45. A data processing system as claimed in claim 13, wherein the data processing system is a blade server comprising one or more blades supported at a chassis, each blade having one or more central processing units at least one of which includes a network interface controller, and the media interface being located at the chassis of the blade server.

46. A data processing system as claimed in claim 45, wherein the central processing unit and second central processing unit are located at the same blade of the blade server.

47. A data processing system as claimed in claim 46, wherein the central processing unit and second central processing unit are accessible to one another over a CPU interconnect comprising a data link of the first interconnect and a data link of the second interconnect.

48. A data processing system as claimed in claim 45, wherein the central processing unit and second central processing unit are located at different blades of the blade server.

49. A data processing system as claimed in claim 45, wherein the network interface controller is configured to, if the destination network address of intermediate data units formed at the central processing unit is a network address belonging to a process supported at the second central processing unit, cause interconnect data packets encapsulating the intermediate data units to be transmitted over the CPU interconnect to the second network interface controller not via the media interface.

50. A data processing system as claimed in claim 45, wherein the media interface is supported at a peripheral data bus and the blades of the blade server are configured to communicate with one another over the peripheral data bus.

51. A data processing system as claimed in claim 50, further comprising a switch at the chassis of the blade server, the switch being configured to route interconnect data packets between the blades of the blade server.

52. A data processing system as claimed in claim 51, wherein the switch is configured to route interconnect data packets in dependence on their framing information at the level of the data protocol in use over the peripheral data bus.

53. A data processing system as claimed in claim 51, wherein the switch is configured to route interconnect data packets encapsulating intermediate data units in dependence on framing information of the intermediate data units at the level of the network protocol.

54. A data processing system as claimed in claim 51, wherein the peripheral data bus is PCIe and the switch is a PCIe switch.

55. A data processing system as claimed in claim 13, wherein the media interface is one of a regular PCIe device, an SR-IOV PCIe device and an MR-IOV PCIe device.

56. A data processing system as claimed in claim 54, wherein the media interface is an SR-IOV PCIe device and the switch is an MR-IOV PCIe switch.

57. A data processing system as claimed in claim 13, wherein the media interface and each network interface controller of the data processing system are configured to exchange control data by means of one or more interconnect data packets.

58. A data processing system as claimed in claim 13, wherein the network protocol is Ethernet.

59. A method for transmitting data over a network from a data processing system comprising a media interface at the interface to the network, a central processing unit having a memory management unit for accessing a memory, and an interconnect connected between the central processing unit and the media interface, the method comprising:
 a network interface controller located at the central processing unit:
  retrieving data for transmission over the network from a transmit queue at the memory by means of the memory management unit;
  partially framing, according to the data link layer of a network protocol, data packets containing the retrieved data to form intermediate data units; and
  in accordance with the data protocol in use over the interconnect, encapsulating the intermediate data packets of the network protocol in data packets for transmission over the interconnect and transmitting the encapsulated intermediate data packets over the interconnect to the media interface,
 and the media interface:
  receiving the encapsulated intermediate data packets;
  extracting the intermediate data packets of the network protocol from the encapsulated intermediate data packets;
  processing the intermediate data packets of the network protocol at the physical layer of the network protocol so as to complete the framing of the intermediate data packets in accordance with the network protocol; and
  transmitting the fully-formed data packets of the network protocol onto the network.

60. A method for receiving data over a network at a data processing system comprising a media interface at the interface to the network, a central processing unit having a memory management unit for accessing a memory, and an interconnect connected between the central processing unit and the media interface, the method comprising:
 the media interface:
  receiving network data packets over the network; and
  in accordance with the data protocol in use over the interconnect, encapsulating the received network data packets in data packets for transmission over the interconnect and transmitting the data packets over the interconnect to a network interface controller located at the central processing unit,
 and the network interface controller:
  receiving the encapsulated data packets;
  extracting the received network data packets from the encapsulated data packets;
  at least partially processing each received network data packet at the data link layer in accordance with the network protocol so as to extract the data carried within each received network data packet; and
  writing the extracted data to a receive queue at the memory by means of the memory management unit.

61. A method for communicating data between central processing units at a data processing system having a first central processing unit and a second central processing unit coupled together by means of an interconnect, each central processing unit comprising a respective network interface controller operable to (a) form intermediate data units by at least partially framing data for communication at the data link layer in accordance with a network protocol, and (b) at least partially process at the data link layer in accordance with the network protocol intermediate data units so as to extract the data for communication carried within each intermediate data unit, the method comprising:
 the first central processing unit passing data for communication to its first network interface controller,
 the first network interface controller:
  forming intermediate data units comprising the data for communication by at least partially framing the data for communication at the data link layer in accordance with the network protocol;
  encapsulating the intermediate data units of the network protocol in data packets for transmission over the interconnect; and
  transmitting the encapsulated data packets over the interconnect to the second network interface controller,
 and the second network interface controller:
  receiving the encapsulated data packets;
  extracting the intermediate data units from the encapsulated data packets;
  at least partially processing each intermediate data unit at the data link layer in accordance with the network protocol so as to extract the data carried within each intermediate data unit; and
  passing the extracted data to the second central processing unit.

62. A central processing unit for a data processing system, the central processing unit comprising:
 a processing core;
 a link module for communicating data packets of a predetermined data protocol over a data bus;
 a memory management unit operable to retrieve data from a memory coupled to the central processing unit; and
 a network interface controller configured to:
  retrieve data for transmission over a network by means of the memory management unit;
  frame at the data link layer of a network protocol data packets that contain retrieved data; and
  cause those packets to be encapsulated in data packets of the predetermined data protocol and communicated over the data bus by means of the link module.

63. A central processing unit as claimed in claim 62, wherein the network interface controller does not frame data packets at the physical layer of the network protocol.

64. A central processing unit for a data processing system, the central processing unit comprising:
 a processing core;
 a cache;
 a memory management unit operable to retrieve data from a memory coupled to the central processing unit; and
 a network interface controller configured to at least partially form a series of network data packets for transmission by generating data link layer information for each of those packets, the network interface controller further configured to, when in use, store at least some of its state at a memory coupled to the central processing unit;

wherein the processing core and network interface controller are configured to access a memory coupled to the central processing unit by means of the memory management unit, and the cache is configured to cache data stored at a memory coupled to the central processing unit.

65. A central processing unit as claimed in claim 64, wherein the state of the network interface controller includes one or both of a forwarding table and an address translation table.

66. A peripheral electronic device supported at a data processing system and presenting itself as a PCIe device to the data processing system, the data processing system comprising a central processing unit and a PCIe data bus, and the peripheral electronic device having two components:
   a core component located at the central processing unit, the core component being operable to handle I/O requests for the peripheral electronic device, and
   a peripheral component accessible to the core component over the PCIe data bus;
   wherein the core component is configured to be responsive to I/O requests directed to the peripheral component.

67. A peripheral electronic device as claimed in claim 66, wherein the core component is allocated a hardware address range defining its control aperture and the peripheral component is configured to provide a Base Address Register indicating a range of hardware addresses that includes the base address of the control aperture of the core component such that I/O requests directed to the range of hardware addresses indicated by the Base Address Register are handled at the control aperture of the core component.

68. A peripheral electronic device as claimed in claim 66, wherein the peripheral component is additionally a component of one or more other PCIe devices and the peripheral component is configured to provide an additional Base Address Register for each other PCIe device, each additional Base Address Register being configured such that I/O requests directed to the range of hardware addresses indicated by that Base Address Register are handled at a respective core component of that other PCIe device.

69. A peripheral electronic device as claimed in claim 66, wherein the peripheral component is configured to forward interrupt configuration requests it receives to the core component for handling at the core component.

70. A peripheral electronic device as claimed in claim 66, wherein the peripheral component further provides a legacy Base Address Register supporting a set of legacy registers, the peripheral component being configured to, when a legacy register is read or written, map the read or write to the legacy register to a read or write to the control aperture of the core component such that legacy I/O requests directed to the set of legacy registers are handled at the control aperture of the core component.

* * * * *